(12) United States Patent
Wesselhoff

(10) Patent No.: US 10,678,957 B2
(45) Date of Patent: *Jun. 9, 2020

(54) TAMPER RESPONSIVE SENSOR

(71) Applicant: Cryptera A/S, Glostrup OT (DK)

(72) Inventor: Erling Wesselhoff, Praestoe (DK)

(73) Assignee: Cryptera A/S, Glostrup (DK)

( * ) Notice: Subject to any disclaimer, the term of this patent is extended or adjusted under 35 U.S.C. 154(b) by 70 days.

This patent is subject to a terminal disclaimer.

(21) Appl. No.: 16/027,780

(22) Filed: Jul. 5, 2018

(65) Prior Publication Data

US 2018/0322315 A1 Nov. 8, 2018

Related U.S. Application Data

(63) Continuation of application No. 14/903,214, filed as application No. PCT/EP2014/063700 on Jun. 27, 2014, now Pat. No. 10,078,764.

(30) Foreign Application Priority Data

Jul. 11, 2013 (DK) .................................. 201300422

(51) Int. Cl.
| | |
|---|---|
| *H04L 29/06* | (2006.01) |
| *G06F 21/86* | (2013.01) |
| *G06F 21/87* | (2013.01) |
| *G07F 19/00* | (2006.01) |
| *H04L 9/08* | (2006.01) |
| *G06F 21/72* | (2013.01) |

(52) U.S. Cl.
CPC .............. *G06F 21/86* (2013.01); *G06F 21/72* (2013.01); *G06F 21/87* (2013.01); *G07F 19/207* (2013.01); *H04L 9/0897* (2013.01); *G06F 2221/2143* (2013.01); *H04L 2209/127* (2013.01)

(58) Field of Classification Search
CPC .......... G06F 21/86; G06F 21/72; G06F 21/75; G06F 2221/2143; H04L 9/0897
USPC .......................................................... 726/34
See application file for complete search history.

(56) References Cited

U.S. PATENT DOCUMENTS

| | | | |
|---|---|---|---|
| 2010/0017621 A1* | 1/2010 | Crawford ................ G06F 21/72 |
| | | | 713/189 |
| 2011/0048756 A1* | 3/2011 | Shi ........................... G06F 21/87 |
| | | | 174/50 |
| 2013/0019114 A1* | 1/2013 | Sumida ..................... G06F 1/26 |
| | | | 713/300 |

(Continued)

*Primary Examiner* — Evans Desrosiers
(74) *Attorney, Agent, or Firm* — Black, McCuskey, Souers & Arbaugh, LPA

(57) ABSTRACT

A tamper responsive sensor comprising: a carrier printed circuit board ("carrier PCB"), holding a mesh of one or more electrically conductive tracks, a pressure or force sensitive switch contact arranged on top of the carrier PCB and having first and second electrical contact connections, tamper detecting circuitry arranged at the carrier PCB and being powered via two electrical power lines and connected to one or more electrically conductive signal lines, wherein one of said power lines or one of said signal lines is electrically connected to the tamper detecting circuitry via a first tamper line holding the switch contact, and wherein one of said power lines or one of said signal lines is electrically connected to the tamper detecting circuitry via a second tamper line holding a conductive track of the carrier PCB mesh.

27 Claims, 28 Drawing Sheets

(56) References Cited

U.S. PATENT DOCUMENTS

2013/0265163 A1* 10/2013 Joyce ................. G06F 21/86
340/551

* cited by examiner

TAMPER FOIL TOP
1 — 
2 —⊐
☐ NORMAL VIA
1-MESH
2-MESH-FOUR CONNECTIONS
   TO TAMPER PCB

TAMPER PCB
1 —
2 —⊐
☐ NORMAL VIA
1-ROUTING-FOUR CONNECTIONS
   TO TAMPER FOIL TOP
2-COMPONENT SIDE- FOUR
   INSIDE PLATINGS FOR
   SOLDERING TO TAMPER SPACER

TAMPER SPACER
1 —
2 —
3 —
4 —
☐ NORMAL VIA
1-GND-FOUR INSIDE PLATINGS FOR
   SOLDERING TO TAMPER PCB
2-MESH
3-MESH
4-GND-FOUR OUTSIDE PLATINGS
   FOR SOLDERING

FIG. 13a

TAMPER FOIL TOP
1 —
2 —⊐
☐ NORMAL VIA
1-MESH
2-MESH-FOUR CONNECTIONS
   TO TAMPER PCB

TAMPER PCB
1 —
2 —⊐
☐ NORMAL VIA
1-ROUTING-FOUR CONNECTIONS
   TO TAMPER FOIL TOP
2-COMPONENT SIDE- FOUR
   INSIDE PLATINGS FOR
   SOLDERING TO TAMPER SPACER

TAMPER SPACER
1 —
2 —
3 —
4 —
☐ NORMAL VIA
1-GND-FOUR INSIDE PLATINGS FOR
   SOLDERING TO TAMPER PCB
2-MESH
3-MESH
4-GND-FOUR OUTSIDE PLATINGS
   FOR SOLDERING

TAMPER FOIL BOTTOM
1 —
2 —⊐
☐ NORMAL VIA
1-MESH
2-MESH-FOUR CONNECTIONS
   TO TAMPER PCB

TAMPER RESPONSIVE SENSOR

CROSS REFERENCE TO RELATED APPLICATIONS

This application is a continuation of U.S. patent application Ser. No. 14/903,204 filed Jan. 6, 2016, that is a National Stage entry under 35 U.S.C. § 371 from International application No. PCT/EP2014/063700, filed Jun. 27, 2014 that claims foreign priority to DK application No. PA201300422 filed Jul. 11, 2013. The contents of the aforementioned application/s is/are hereby incorporated by reference herein in its/their entirety.

TECHNICAL FIELD

The present invention relates to a tamper responsive sensor, which can be used for protecting critical elements from being disassembled or removed, such as for example the removal of a cardreader from an ATM.

BACKGROUND

The purpose of this invention is to ensure a high protection level in several applications e.g. inside a Point Of Service (POS) terminal, Encrypting PIN Pad (EPP) or detection of removal of a cardreader from an ATM terminal.

The tamper responsive sensor according to the present invention provides a cost effective solution to the problem of providing a secure PCB (Printed Circuit Board), which for example may be used in a POS terminal or an ATM terminal.

SUMMARY OF THE INVENTION

The tamper responsive sensor of the present invention may be used for mounting on a 3rd party PCB, which may be an insecure 3rd party PCB and thereby provide a level of protection similar to that of a secure PCB.

Instead of having one large secure PCB covering an entire POS terminal, the sensor of the present invention can be used to cover a smaller PCB or a smaller area of a PCB, thereby obtaining a small, secure PCB or PCB area. Several of such small secure PCBs or PCB areas can be used in a distributed solution and replace a single large secure PCB.

This can keep the cost of a secure PCB solution to a minimum and still ensure a high level of protection. The use of the closure of the present invention may enable the detection of a disassembly of a POS terminal, and may further make it very difficult for a potential attacker to get access to PCB components covered by the sensor of the invention.

According to a first aspect of the present invention there is provided a tamper responsive sensor comprising: a carrier printed circuit board ("carrier PCB"), holding a mesh of one or more electrically conductive tracks, a pressure or force sensitive switch contact arranged on top of the carrier PCB and having first and second electrical contact connections, tamper detecting circuitry arranged at the carrier PCB and being powered via two electrical power lines and connected to one or more electrically conductive signal lines, wherein one of said power lines or one of said signal lines is electrically connected to the tamper detecting circuitry via a first tamper line holding the switch contact, and wherein one of said power lines or one of said signal lines is electrically connected to the tamper detecting circuitry via a second tamper line holding a conductive track of the carrier PCB mesh, thereby enabling the tamper detecting circuit to detect an interruption of the signal path through the first tamper line and/or an interruption of the of signal path through the second tamper line.

According to an embodiment of the invention, the first tamper line and the second tamper line are serial connected, which serial connection holds the switch contact and a conductive track of the carrier PCB mesh, whereby one of said power lines or one of said signal lines is electrically connected to the tamper detecting circuitry through said serial connection.

It is also within one or more embodiments of the invention that the first tamper line and the second tamper line are separate signal lines.

According to one or more embodiments of the invention, the second tamper line may further hold a conductive track of the carrier PCB mesh being serial connected to the switch contact.

It should be understood that for the sensor of the present invention, then the electrical signal path through a tamper line is interrupted or broken when a track or mesh track being part of said tamper line is cut or short-circuited, and the electrical signal path through the second tamper line is interrupted or broken when the switch contact is in the open position.

It is preferred that the carrier PCB is arranged on top of a spacer board. It is also preferred that the tamper detecting circuitry is arranged at the bottom of the carrier PCB. The spacer board may be fully encircling or surrounding the tamper detecting circuitry, and the wall height of the spacer board may be higher than the height of the tamper detecting circuitry. The carrier PCB and the spacer board may be separate boards, but it is within one or more embodiments of the invention that the carrier PCB and the spacer board is made as a single board. The spacer board may comprise a mesh of one or more electrically conductive tracks, and the first tamper line and/or the second tamper line may further hold a conductive track of the spacer board mesh in serial connection with the switch contact and/or mesh track(s) of the first and/or second tamper line.

The present invention also covers embodiments wherein the tamper responsive sensor further comprises a bottom board arranged at the bottom of the spacer board, where the bottom board may comprise a mesh of one or more electrically conductive tracks, and where the first tamper line and/or the second tamper line may further hold a conductive track of the bottom board mesh in serial connection with the switch contact and/or mesh track(s) of the first and/or second tamper line. Here, one or more bottom board mesh tracks may be connected to one or more corresponding electrical contact connections provided at the top of the bottom board. It is within one or more embodiments of the invention that one or more spacer board mesh tracks are connected to one or more corresponding electrical contact connections provided at the side or bottom of the spacer board, and one or more bottom board mesh tracks may be connected to one or more spacer board mesh tracks via corresponding electrical contact connections of the bottom board and the spacer board.

As an alternative to the bottom board, the present invention covers embodiments wherein the tamper responsive sensor further comprises a bottom membrane arranged at the bottom of the spacer board. The bottom membrane may comprise a bottom mesh of one or more electrically conductive tracks, and the first tamper line and/or the second tamper line may further hold a conductive track of the bottom membrane mesh in serial connection with the switch contact and/or mesh track(s) of the first and/or second tamper line.

The present invention also covers embodiments wherein the tamper responsive sensor further comprises a flexible membrane on top of the carrier PCB with the pressure or force sensitive switch contact interposed between the carrier PCB and the flexible top membrane. The top membrane may comprise a mesh of one or more electrically conductive tracks, and the first tamper line and/or the second tamper line may further hold a conductive track of the top membrane mesh in serial connection with the switch contact and/or mesh track(s) of the first and/or second tamper line.

Thus, several or each mesh may hold two separate electrically conductive tracks, with a first of said conductive tracks being part of the first tamper line and a second of said conductive tracks being part of the second tamper line.

According to an embodiment of the invention, then a first of the two power lines may be electrically connected to the tamper detecting circuitry via the first tamper line, and the second of the power lines may be electrically connected to the tamper detecting circuitry via the second tamper line.

The present invention covers embodiments, wherein the tamper detecting circuitry has a first signal output and a first signal input being electrically connected together by a conductive signal line holding the first tamper line. It is also within embodiments of the invention that the tamper detecting circuitry has a second signal output and a second signal input being electrically connected together by a conductive signal line holding the second tamper line.

It is preferred that the tamper detecting circuitry has a data communication signal input/output for receiving and/or forwarding data to and from an external data communication system, where the data communication signal input/output is connected to one of said conductive signal lines. Here, the conductive signal line being connected to the data communication signal input/output may hold the first or the second tamper line.

It is within one or more embodiments of the invention that the tamper detecting circuitry comprises a memory for storing an encryption key, and that the tamper detecting circuitry is adapted for encrypting data by use of the stored encryption key and further adapted for outputting the encrypted data. It is within an embodiment of the invention that upon detection of a breakage or interruption in any of the tamper lines, the tamper detecting circuitry is adapted for erasing the encryption key stored in the memory.

According to the present invention there is also provided a system, which comprises a tamper responsive sensor according to the first aspect of the invention with a tamper detecting circuitry having a memory for storing an encryption key, and which further comprises a security processor being external to the tamper responsive sensor and being connected to the tamper circuitry for forwarding and receiving data to and from the tamper detecting circuitry. The security processor may be adapted for determining from encrypted date received from the tamper detecting circuitry, whether a tamper line has been tampered or interrupted or not. The security processor may also adapted for forwarding an encryption key to the tamper detecting circuitry for storing in the memory of the tamper detecting circuitry.

According to one embodiment of the system of the invention, then the security processor and the tamper detecting circuitry are adapted for performing a "one way encryption process" to thereby determine whether the switch tamper line has been tampered or interrupted or not. Here, the security processor and the tamper detecting circuitry may store corresponding encryption keys, and the security processor may be adapted for forwarding a message to the tamper detecting circuitry and for encrypting said message by use of the stored key, and the tamper detecting circuitry may be adapted for encrypting the received message by use of the stored key and for forwarding the encrypted result to the security processor, which security processor may be adapted for comparing the received encrypted result with its own encrypted result to thereby determine whether a tamper line has been tampered or interrupted or not.

According to another embodiment of the system of the invention, the security processor and the tamper detecting circuitry are adapted for performing a "two way encryption process" to thereby determine whether a tamper line has been tampered or interrupted or not. Here, the security processor and the tamper detecting circuitry may store corresponding keys for encryption and decryption.

According to a second aspect of the present invention there is provided a tamper responsive sensor comprising: a carrier printed circuit board ("carrier PCB"), a flexible membrane on top of the carrier PCB, a pressure or force sensitive switch contact interposed between the carrier PCB and the flexible top membrane, a mesh of one or more electrically conductive tracks arranged at the top membrane, and tamper detecting circuitry arranged on the carrier PCB and being powered via two electrical power tracks and connected to one or more electrically conductive signal line, wherein at least one of the power tracks or one of the electrically conductive signal lines is connected to a conductive track of the top membrane mesh.

The second aspect of present invention covers an embodiment wherein the pressure or force sensitive switch contact is connected to the tamper detecting circuitry and to one of the power tracks so as to break the power delivery to the tamper detecting circuitry when in the open position. The switch contact may be connected to the power track and the tamper detecting circuitry via conductive tracks of the carrier PCB.

The second aspect of the present invention also covers another embodiment wherein the pressure or force sensitive switch contact is connected to the tamper detecting circuitry and to one of the electrically conductive signal lines so that signaling to/from the tamper detecting circuitry via said electrically conductive signal line is interrupted or broken when the switch contact is in the open position. The switch contact may be connected to the electrically conductive signal line and the tamper detecting circuitry via conductive tracks of the carrier PCB.

For the second aspect of the invention, the mesh of the top membrane may be interposed between the outer surface of the top membrane and the switch contact, For the second aspect of the invention, it is preferred that the switch contact is a normal open switch contact, but the present invention also covers embodiments where the switch contact is a normal closed contact. It is also preferred that the switch contact is connected to the power track and the tamper detecting circuitry via conductive tracks of the carrier PCB. It is also preferred that the flexible top membrane and the switch contact are arranged so that the switch contact is closed only when the flexible top membrane is pressed down against the switch contact. In order to close the switch contact a predetermined minimum weight force may have to be delivered to the flexible top membrane. Here, a weight force of minimum 0.588 N (corresponding to 60 g), such as 0.686 N (corresponding to 70 g), such as 0.784 N (corresponding to 80 g), such as 0.833 N (corresponding to 85 g), such as 0.98 N (corresponding to 100 g), such as 1.96

N (corresponding to 200 g), such as 2.94 N (corresponding to 300 g), may have to be delivered to the flexible top membrane in order to close the switch contact.

According to one or more embodiments of the second aspect of the invention, one or both power tracks are part of the conductive tracks of the top membrane mesh. It is also within an embodiment of the invention that the electrically conductive signal line is part of the conductive tracks of the top membrane mesh.

It is within an embodiment of the second aspect of the invention that the tamper responsive sensor further comprises a spacer board, with the carrier PCB is arranged on top of the spacer board, and wherein the spacer board comprises a mesh of one or more electrically conductive tracks. Here, at least one of the two power tracks used for powering the tamper detecting circuitry may be part of the conductive tracks of the spacer board mesh. Preferably, both power tracks used for powering the tamper detecting circuitry are part of the conductive tracks of the spacer board mesh. It is also within an embodiment of the invention that the electrically conductive signal line connected to the tamper detecting circuitry is part of the conductive tracks of the spacer board mesh. The conductive power track or tracks of the spacer board mesh may be connected to corresponding power track or tracks of the top membrane mesh via corresponding track or tracks of the carrier PCB.

The second aspect of the present invention also covers an embodiment wherein the carrier PCB comprises a mesh of one or more electrically conductive tracks. Here, at least one of the two power tracks used for powering the tamper detecting circuitry may be part of the conductive tracks of the carrier PCB mesh. Preferably, both power tracks used for powering the tamper detecting circuitry are part of the conductive tracks of the carrier PCB mesh. It is also within an embodiment of the invention that the electrically conductive signal line connected to the tamper detecting circuitry is part of the conductive tracks of the carrier PCB mesh.

According to an embodiment of the second aspect of the invention, the tamper responsive sensor further comprises a bottom membrane arranged at the bottom of the spacer board, where the bottom membrane comprises a bottom mesh of one or more electrically conductive tracks. Here, at least one of the two power tracks used for powering the tamper detecting circuitry may be part of the conductive tracks of the bottom membrane mesh. Preferably, both power tracks used for powering the tamper detecting circuitry are part of the conductive tracks of the bottom membrane mesh. It is also within an embodiment of the invention that the electrically conductive signal line connected to the tamper detecting circuitry is part of the conductive tracks of the bottom membrane mesh.

It is within an embodiment of the invention that input connections for the two power tracks are provided at the bottom membrane, and it is also within an embodiment of the invention that an input connection for the electrically conductive signal line is provided at the bottom membrane. The present invention also covers embodiments wherein the spacer board comprises input connections for the two power tracks.

For the second aspect of the invention, it is preferred that the tamper detecting circuitry has one or more data communication signal input/outputs for receiving and forwarding data. Here, one of the electrically conductive signal line may be part of said one or more data communication signal input/outputs. The spacer board may comprise electrically conductive track(s) and input connection(s) for the one or more data communication signal input/outputs of the tamper detecting circuitry, but it is also within an embodiment of the invention that the bottom membrane comprises electrically conductive track(s) and input connection(s) for the one or more data communication signal input/outputs of the tamper detecting circuitry.

According to an embodiment of the invention, the tamper detecting circuitry may be arranged at the bottom of the carrier PCB. It is preferred that the spacer board fully encircles or surrounds the tamper detecting circuitry, and it is further preferred that the wall height of the spacer board is higher than the height of the tamper detecting circuitry.

It is within one or more embodiments of the second aspect of the invention that the tamper detecting circuitry comprises a memory for storing an encryption key. It is preferred that upon failure in power delivery, then the tamper detecting circuitry is adapted for erasing the encryption key stored in the memory. The tamper detecting circuitry may be adapted for encrypting received data by use of the stored encryption key, and further be adapted for outputting the encrypted data. The present invention also covers a system comprising a tamper responsive sensor having such as tamper detecting circuitry storing an encryption key, and further comprising a security processor being connected to the tamper detecting circuitry for forwarding data to the tamper detecting circuitry and for receiving the forwarded data in an encrypted format from the tamper detecting circuitry. Here, the security processor may be adapted for forwarding an encryption key to the tamper detecting circuitry for storing in the memory of the tamper detecting circuitry.

BRIEF DESCRIPTION OF THE DRAWINGS

The accompanying drawings incorporated herein and forming a part of the specification illustrate the example embodiments.

FIGS. 1a and 2b, FIGS. 4b and 4c are schematic top views of two examples of a tamper responsive sensor of the third class of embodiments of the invention.

DESCRIPTION OF EXAMPLE EMBODIMENTS

Figure 1A:
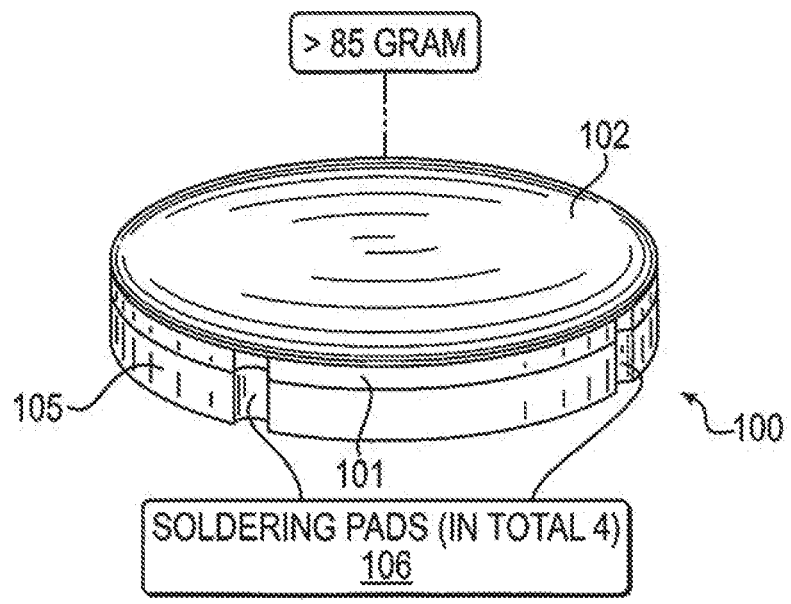
FIGS. 1a and 1b are front and a cross sectional views, respectively, of a tamper responsive sensor according to an example of a first class of embodiments of the invention.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Figure 1B:
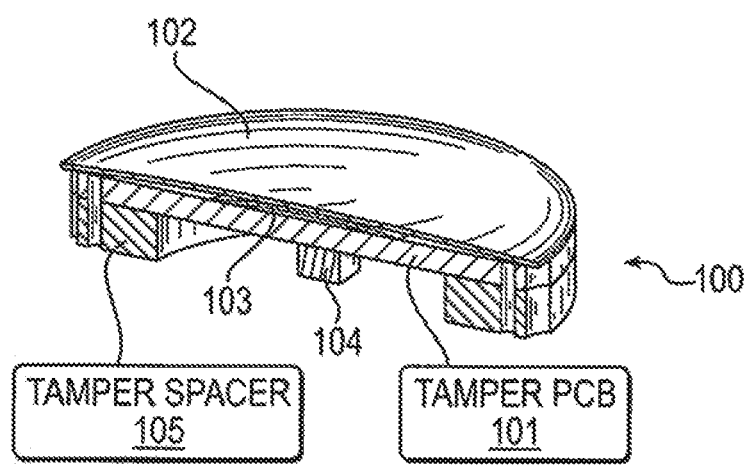

The present invention provides tamper responsive sensors. FIGS. 1a and 1b show front and cross sectional views, respectively, of an example of such a tamper responsive sensor according to a first class of embodiments of the invention.

The sensors of the invention has been designed in order to create a remote security zone, which can protect security critical elements from being disassembled or removed. Examples could be the protection of a product against disassembly, such as a card-reader being protected against removal from an ATM terminal, or in general to detect if two parts is taken apart from each other. The design of the tamper responsive sensor or sensors of the invention may further ensure that the sensor or sensors cannot be tampered without generating a response.

According to an embodiment of the invention, the sensor holds communication circuitry for communicating to circuitry outside the sensor, and in order to secure against attacks to the communications cables, encrypted data communication may be used.

The tamper responsive sensor or switch 100 of FIGS. 1a and 1b comprises a carrier printed circuit board, carrier PCB or Tamper PCB, 101, a flexible membrane or tamper foil 102 on top of the carrier PCB, a pressure or force sensitive switch contact 103 interposed between the carrier PCB 101 and the flexible membrane 102. Tamper detecting circuitry 104 is arranged on the carrier PCB 101. For the embodiment of FIGS. 1a and 1b, the sensor or switch 100 further comprises a spacer board or tamper spacer 105, with the carrier PCB 101 being arranged on top of the spacer board 105, and with the tamper detecting circuitry 104 arranged on the carrier PCB.

Figure 9A:
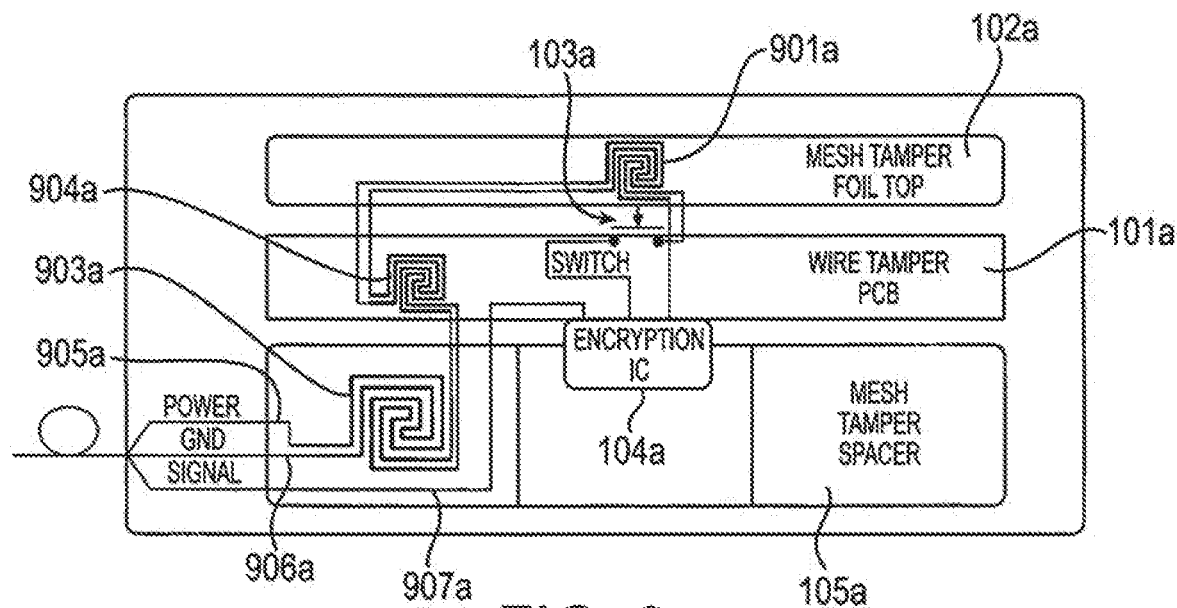

A mesh of one or two electrically conductive tracks 901a-901d (see FIGS. 9a-9d) is arranged at the membrane or foil 102 and may be interposed between the outer surface of the membrane and the switch contact 103. The tamper detecting circuitry 104 is powered via two electrical power tracks, and according to an embodiment of the invention one or both of said power tracks are part of the conductive tracks of the membrane mesh 901a, 901b (see FIGS. 9a and 9b). The pressure or force sensitive switch contact 103 may be connected to one of the power tracks and to the tamper detecting circuitry 104, so as to break the power delivery to the tamper detecting circuitry 104 when in the open position as illustrated in FIG. 9a, track 901a.

The switch contact 103a may be connected to the power track and the tamper detecting circuitry via conductive tracks 902a of the carrier PCB 101a. The spacer board may also comprise a mesh of one or two electrically conductive tracks 903a-903d, see FIGS. 9a-9d, and one or both of the two power tracks used for powering the tamper detecting circuitry 104 may be part of the conductive tracks of the spacer board mesh 903a, 903b, see FIGS. 9a and 9b. From FIGS. 9a, 9b it is seen that the conductive power tracks of the spacer board mesh 903a, 903b are connected to corresponding power tracks of the membrane mesh 901a, 901b via corresponding carrier mesh tracks 904a, 904b of the carrier PCB 101a, 101b.

The present invention also covers an embodiment, wherein the tamper detecting circuitry 104 is connected to an electrically conductive signal line, which electrically conductive signal line may be part of the conductive tracks of the top membrane mesh 901. Instead of being connected between one of the power tracks and the tamper detecting circuitry 104, the pressure or force sensitive switch contact 103 may be connected to the electrically conductive signal line and to the tamper detecting circuitry 104 so that signaling to the tamper detecting circuitry 104 via the electrically conductive signal line is interrupted or broken when the switch contact is 103 in the open position. The switch contact 103 may connected to the electrically conductive signal line and the tamper detecting circuitry 104 via conductive tracks or mesh tracks of the carrier PCB 104.

For embodiments of the invention having a spacer board 105, the spacer board 105 may comprise input connections for the two power tracks, Power and GND, 905, 906. The tamper detecting circuitry 104 has a data communication signal line input/output 907 for receiving and forwarding data, whereby a response can be obtained if any of the power, GND or data signals connected to the circuitry 104 is being tampered. Also here, the spacer board 105 may comprise an input/output connection for this data communication signal line 907. For embodiments of the invention having the switch contact 103 connected between the tamper detecting circuitry 104 and the electrically conductive signal line, the electrically conductive signal line may be the line used as the data communication signal line for receiving and forwarding data.

In order to protect the tamper detecting circuitry 104, the circuitry 104 may be arranged at the bottom of the carrier PCB 101, with the spacer board 105 fully encircling or surrounding the tamper detecting circuitry 104. The wall height of the spacer board 105 should be higher than the height of the tamper detecting circuitry 104.

It is preferred that the switch contact 103 is a mechanical normal open switch contact. The flexible membrane or foil 102 and the switch contact 103 are arranged so that the switch contact 103 is closed only when the flexible membrane 102 is pressed down against the switch contact 103, see FIG. 1b. In order to close the switch contact 103 a predetermined minimum weight force has to be delivered to the flexible membrane 102. The predetermined weight force may be of a minimum of minimum 0.588 N (corresponding to 60 g), such as 0.686 N (corresponding to 70 g), such as 0.784 N (corresponding to 80 g), such as 0.833 N (corresponding to 85 g)), such as 0.98 N (corresponding to 100 g), such as 1.96 N (corresponding to 200 g), such as 2.94 N (corresponding to 300 g). It is preferred that a minimum weight of 85 g is enough to close the switch contact 103.

It should be understood that according to the present invention, the pressure or force sensitive switch contact 103 can be obtained by several different switch constructions, such a for example a dome 103 pressed against gold contacts on the carrier PCB 101. However, the pressure sensitive switch function may also be obtained by using a microswitch, or by having a layer or pads of carbon at the bottom side of the flexible membrane, which carbon layer or pads may be pressed against electrical contacts point at the carrier PCB 101 to establish electrical contact. It is preferred that the switch contact is a normal open switch contact, but the present invention also covers embodiments where the switch contact is a normal closed switch contact. When using a normal closed switch the interconnection between the switch 103 and the membrane 102 should be constructed in order to pull the switch 103 into the open position, when there is no or only a very small weight force acting on the top of the membrane 102.

The use of the spacer board or tamper spacer PCB 105 provides a security protection against side drilling into the area holding the tamper detecting circuitry and encryption device 104. The spacer board PCB 105 also allows the tamper responsive sensor 100 to be mounted onto another 3rd party PCB, 301, see FIG. 3a.

Figure 1C:
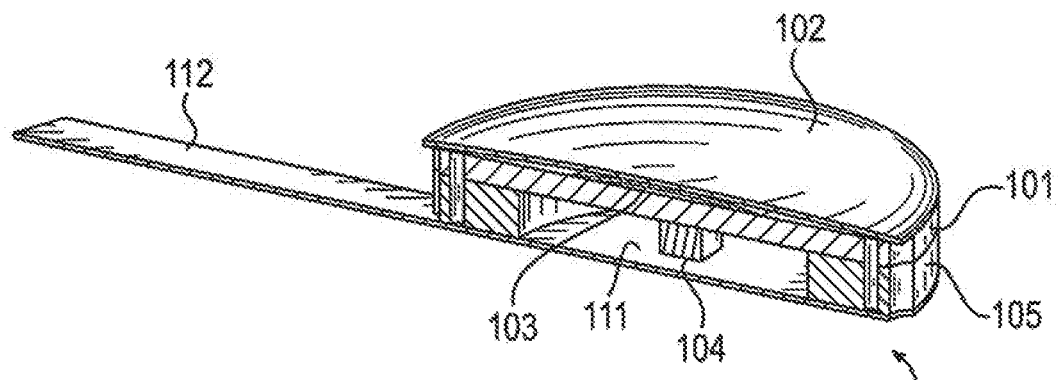
FIG. 1c is a cross sectional view of a tamper responsive sensor according to an example of a second class of embodiments of the invention.

A second optional security membrane or foil holding a mesh of one or more electrically conductive tracks may also be present. This second security foil may be mounted at the bottom of the sensor 100 to protect against attack from the rear. Usually, protection is provided by the 3rd party PCB, on which the sensor 100 is mounted. If the sensor 100 is not attached to a 3rd party PCB, then the second security foil or membrane may be mounted. This is illustrated in FIG. 1c, which is a cross sectional view of an example of a tamper responsive sensor 110 according to a second class of embodiments of the invention. The sensor 110 of FIG. 1c has all the components of the sensor 100 of FIGS. 1a and 1b, but a second flexible membrane or tamper foil 111 is provided at the bottom of the spacer board or tamper spacer 105. A mesh of one or two electrically conductive tracks is arranged at the second membrane or foil 111. For illustration see FIG. 11a, where the tamper sensor 1100a has a main PCB or bottom board 1111a with a bottom board mesh 1110a, which may have the same mesh arrangements as the bottom membrane 111 of the sensor 110 of FIG. 1c. One or both of the power tracks powering the tamper detecting circuitry 104 may be part of the conductive tracks of the second membrane mesh. The data communication signal line or the electrically conductive signal line of the tamper detecting circuitry 104 may also be part of the conductive tracks of the second membrane mesh or bottom board mesh 1111a. It is preferred that the second membrane or tamper foil 111 further holds a flexible so-called "pigtail" 112, which may hold connections for the two power tracks, Power and GND, and for the data communication signal line input/output. Thus electrical supply connection and data communication connection to the tamper detecting circuitry 104 can be made by connecting to the flexible pigtail 112.

Figure 2A:
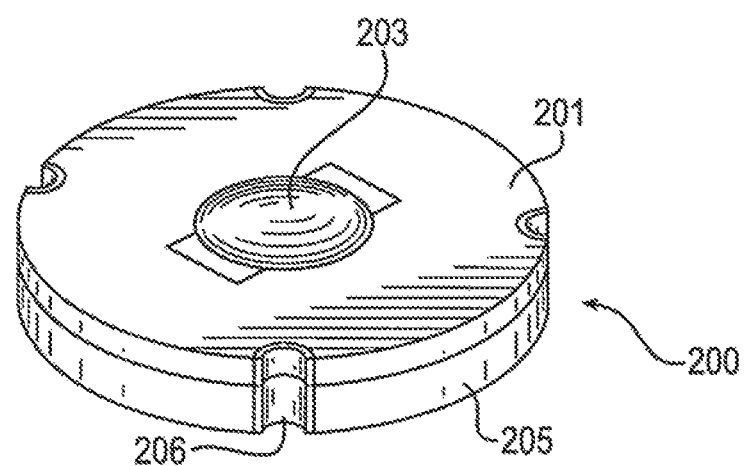
FIGS. 2a and 2b are front and a cross sectional views, respectively, of a tamper responsive sensor according to an example of a third class of embodiments of the invention.
Figure 2B:
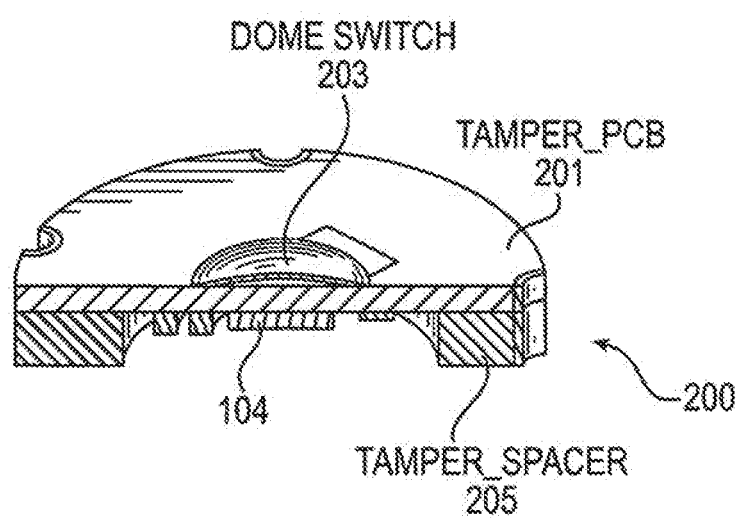

FIGS. 2a and 2b are front and a cross sectional views, respectively, of a tamper responsive sensor 200 according to an example of a third class of embodiments of the invention.

The tamper responsive sensor or switch 200 of the third class of embodiments of the invention is different to the sensors 100 and 110 of the first and second class of embodiments in that there is no membrane or tamper foil at the top of the sensor 200. The sensor 200 of FIGS. 2a and 2b comprises a carrier printed circuit board, carrier PCB or Tamper PCB, 201, a pressure or force sensitive switch contact 203 at the top of the carrier PCB 201. Also here, tamper detecting circuitry 104 is arranged on the carrier PCB. For the embodiment of FIGS. 2a and 2b, the sensor or switch 200 further comprises a spacer board or tamper spacer 205, with the carrier PCB 201 being arranged on top of the spacer board 125, and with the tamper detecting circuitry 104 arranged on the carrier PCB, 201. It is preferred that the circuitry 104 is arranged at the bottom of the carrier PCB 201, as shown in FIG. 2b. The switch contact 203 is the same type of contacts as discussed above for the switch contact 103.

Figure 3A:
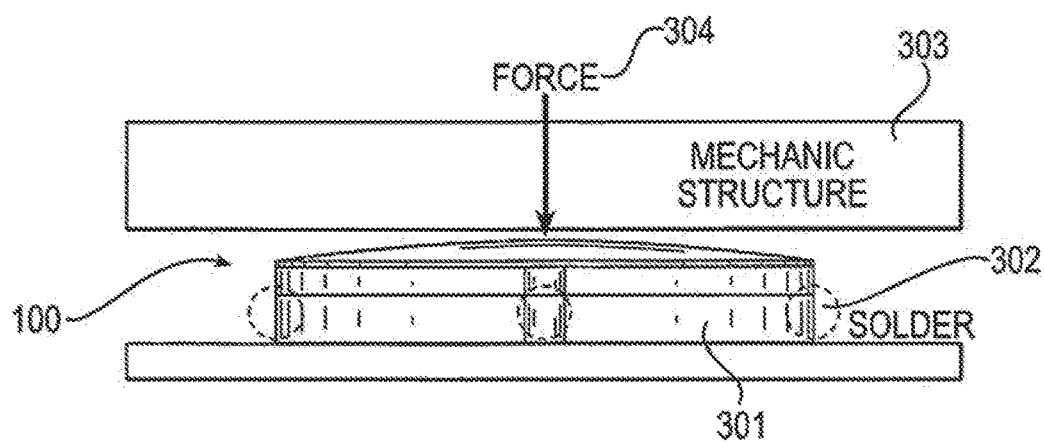
FIG. 3a shows an example of an arrangement of the tamper responsive sensor according to FIGS. 1a and 1b when used to provide protection of a 3rd party PCB.
Figure 14:
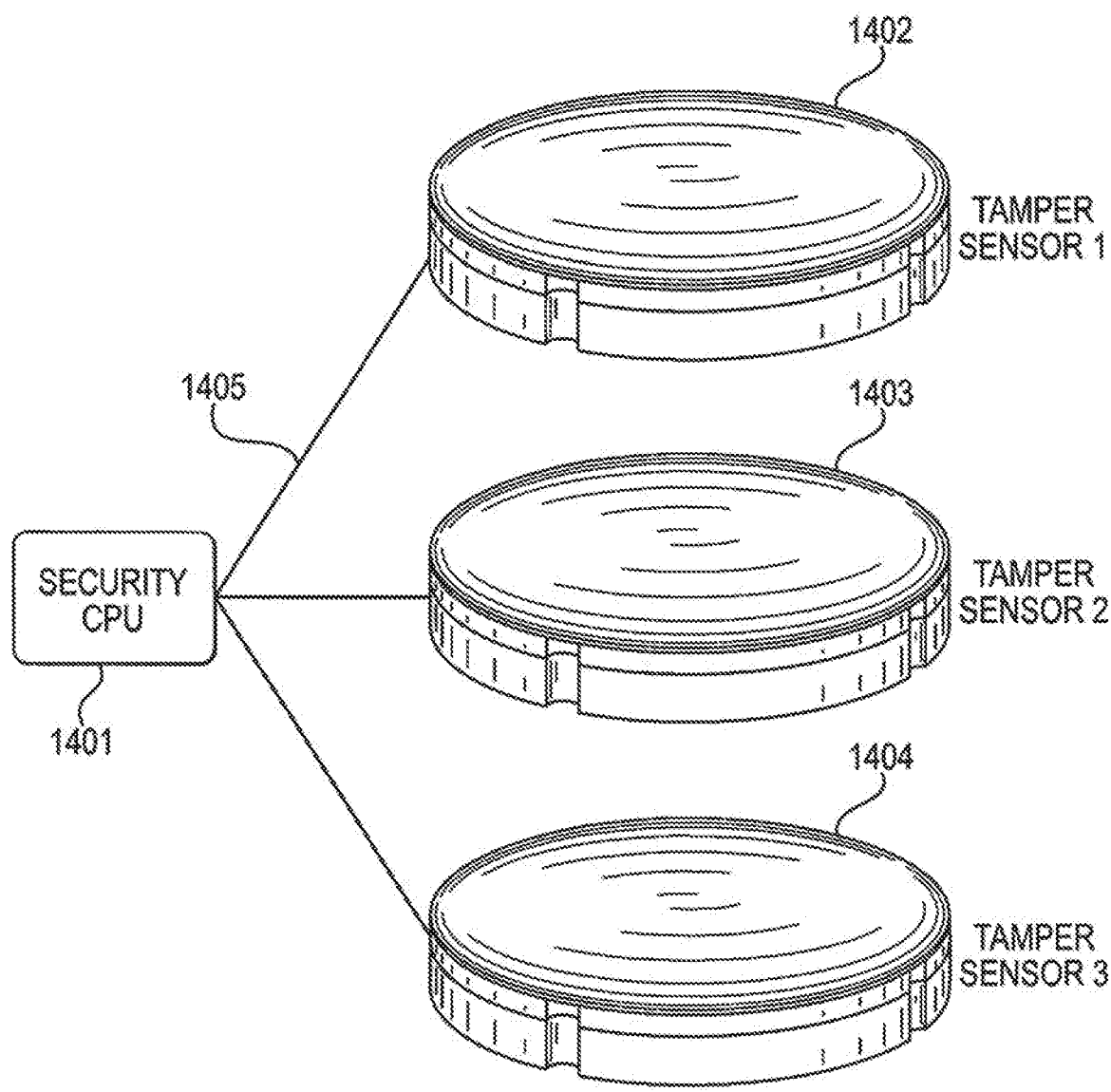
FIG. 14 is a schematic block diagram showing a security system including a security CPU and several tamper responsive sensors according to embodiments of the present invention.

FIG. 3a shows an example of an arrangement of the tamper responsive sensor or switch 100 of FIGS. 1a and 1b when used to provide protection of a 3rd party PCB, 301. The sensor or switch 100 is soldered 302 on the 3rd party PCB 301, and a mechanical structure 303 is provided with the 3rd party PCB 301 being held in a position relative to the structure 303 so as to maintain a pressure or force 304 on the membrane 102 of the sensor 100. As long as the pressure 304 is maintained on the membrane 102, the pressure sensitive switch 103 will be in the closed position and power is supplied to the circuitry 104. If the PCB 301 is removed from its position relative to the mechanical structure 303, then the pressure 304 disappears and the switch 103 turn into the open position and breaks the supply of power to the circuitry 104, or alternatively interrupt or break data communication via the electrically conductive signal line. A break of power supply will be detected by the tamper detecting circuitry 104 and may following be detected by electrical circuitry, such as a Security CPU 1401, see FIG. 14*a*, being connected to the tamper detecting circuitry 104 via the signal line 1405. Alternatively, a break in the data communication signal line or electrically conductive signal line may also be detected by the electric circuitry, such as a Security CPU 1401, being connected to the tamper detecting circuitry 104 via the signal line 1405, as no signal response will be received from the tamper detecting circuitry 104.

Figure 3B:
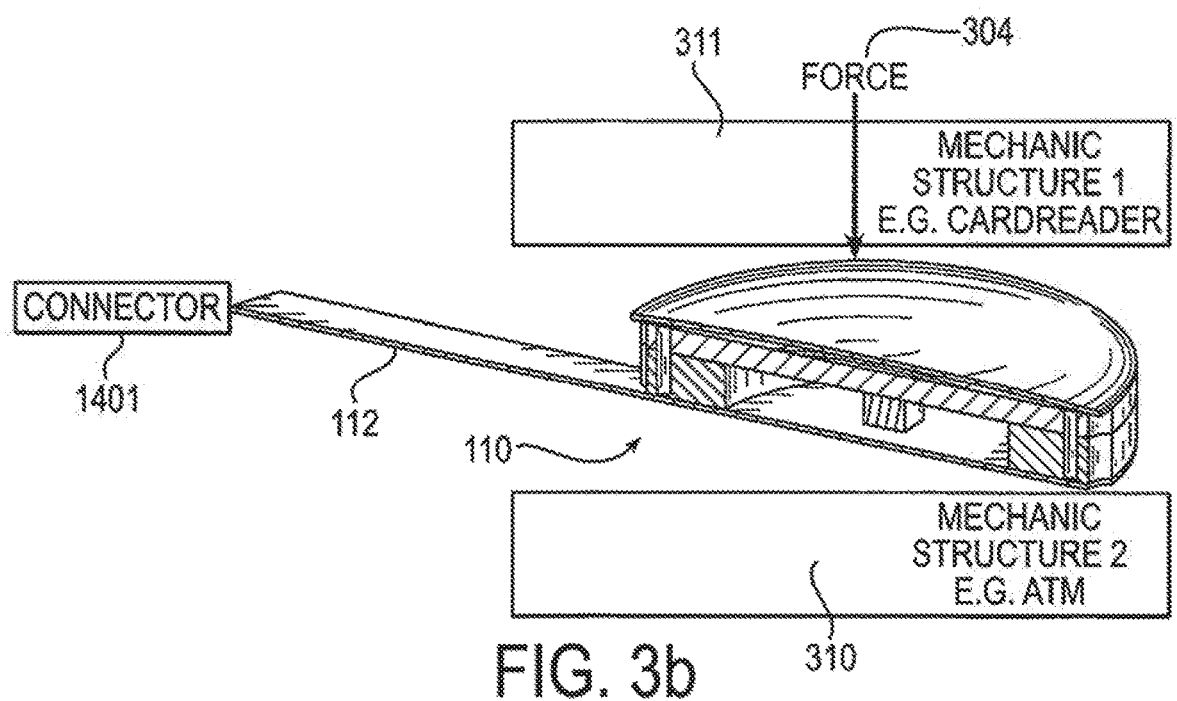
FIG. 3b shows an example of an arrangement of the tamper responsive sensor according to FIG. 1c.

FIG. 3*b* shows an example of an arrangement of the tamper responsive sensor or switch 110 of FIG. 1*c* when used to protect two mechanical structures from being removed from each other. The sensor or switch 110 is mounted in between a first mechanical structure 310, which is an ATM terminal, and a second mechanical structure 311, which is a card-reader. The card-reader 311 is secured to the ATM terminal 310 so as to maintain a pressure 304 on the membrane 102 of the sensor 110. As long as the pressure 304 is maintained on the membrane 102, the pressure sensitive switch 103 will be in the closed position and power is supplied to the circuitry 104. If the card-reader 311 is removed from the ATM terminal 310, then the pressure 304 disappears and the switch 103 turn into the open position and breaks the supply of power to the circuitry 104, or alternatively interrupt or break data communication via the electrically conductive signal line. A break of power supply will be detected by the tamper detecting circuitry 104 and may following be detected by electric circuitry, such as a Security CPU 1410, see FIG. 14*b*, being connected to the tamper detecting circuitry 104 via the signal line 1414 and the connectors of the flexible pigtail 112. Alternatively, a break in the data communication signal line or electrically conductive signal line may also be detected by the electric circuitry, such as a Security CPU 1401, as no signal response will be received from the tamper detecting circuitry 104.

Figure 3C:
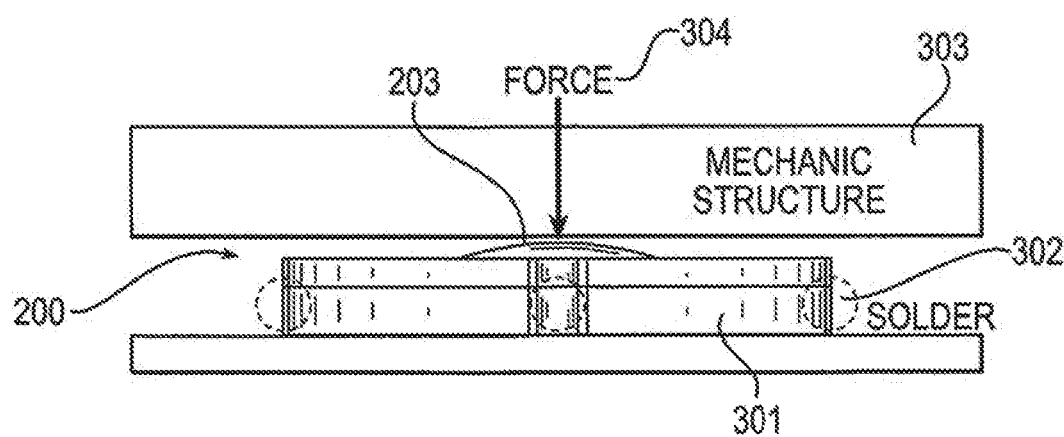
FIG. 3c shows an example of an arrangement of the tamper responsive sensor according to FIGS. 2a and 2b.

FIG. 3*c* shows an example of an arrangement of the tamper responsive sensor or switch 200 of FIGS. 2*a* and 2*b* when used to provide protection of a 3rd party PCB, 301. The arrangement is similar to the arrangement of the sensor 100 in FIG. 3*a*, but the sensor 200 has no top membrane. Thus, the sensor or switch 200 is soldered 302 on the 3rd party PCB 301, and a mechanical structure 303 is provided with the 3rd party PCB 301 being held in a position relative to the structure 303 so as to maintain a pressure or force 304 directly on the pressure sensitive switch 203 of the sensor 200.

The tamper responsive sensor or switch 100, 110, 200 is an active component, which can communicate with a secure device, such as the Security CPU 1401, 1410. The sensors or switches 100 and 200 are designed to be mounted on a 3rd party PCB by soldering or alternately via flex cable. For the soldering it is preferred that soldering pads 106, 206 are provided on the sides of the carrier PCB 101, 201 and the spacer board 105, 205. The carrier PCB 101, 201 and the spacer board 105, 205 may be soldered together on the inner side.

Figure 4A:
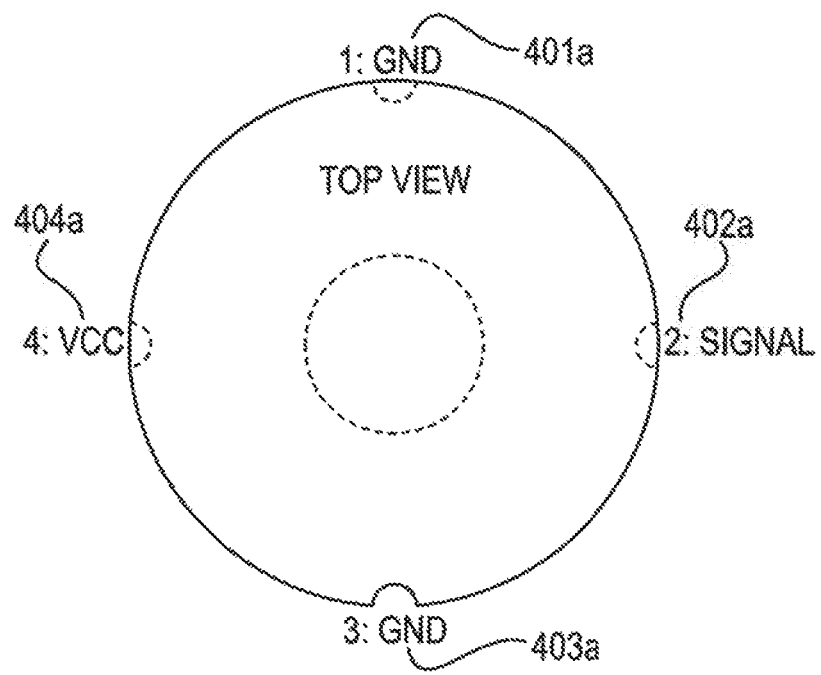
FIG. 4a is a schematic top view of the tamper responsive sensor according

FIG. 4*a* is a schematic top view of the tamper responsive sensor 100 of FIGS. 1*a* and 1*b*, illustrating a possible arrangement of the electronic inputs/outputs. Two electric ground connections GND, 401*a*, 403*a*, corresponding to GND 906*a*, are arranged opposite each other, the VCC power supply 404*a*, corresponding to Power 905*a*, is arranged in between the two grounds GND 401*a*, 403*a*, and the signal input/output 402*a*, corresponding to signal line input/output 907*a*, is arranged opposite the VCC power supply 404*a*. The signal input/output 402*a* may be an open drain output, and an external pull-up resistor may be provided to pull up this signal to VCC for proper communications. The VCC power supply 404*a* may be a power supply in the range of 2.7-5.25 V.

From FIG. 4*a* it is seen that the side plated solder points includes Power 404, 905*a*, GND 401 and 402, 906*a*, and the Signal 402, 907*a*. The Power and GND signals may make up the security around the encryption IC 104, and here the signal 907*a* is not security critical, meaning that it does not require protection or protects other signals. The mesh signals may be generated by having Power 905*a* and GND 906*a* routed in a special serpentine like pattern. However, the electrically conductive signal line or data communication line 907*a* may also be part of the mesh signals. For sensor 100, the mesh may start with the mesh 903*a* on the spacer board 105*a*, which may protect the entire spacer board 105*a* from attack by drilling through the sides. The mesh signals 903*a* are then coupled to the carrier PCB 101*a* by soldering an inner side plating layer. Then the mesh signals 904*a* are connected further to the membrane mesh 901*a* at the membrane 102*a* on top. The membrane or tamper foil 102*a* is preferably covered all the way around with mesh traces 901*a*. The signals are then coupled back to the carrier or tamper PCB 101*a*. From here the GND is routed directly to the tamper detecting circuitry or encryption IC 104*a*. The Power may be routed to the mechanical, pressure sensitive switch 103*a*, and from the switch 103*a* to the encryption IC 104*a*. The encryption IC 104*a* will only operate when the switch 104*a* is pressed down, thereby ensuring that the tamper sensor, switch or sensor 100 can detect any disassembly of the 3rd party PCB 301 from a mechanical structure 303.

Figure 4B:
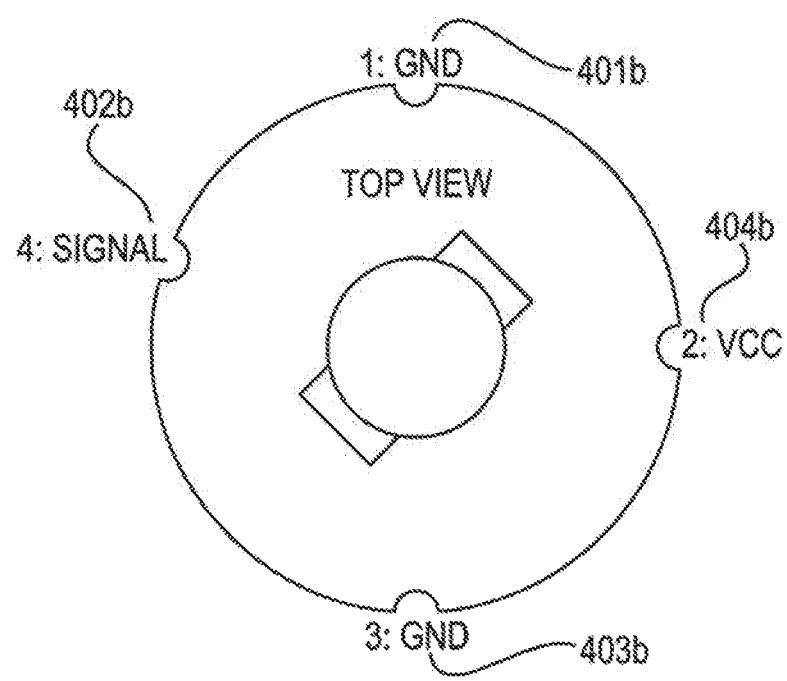
Figure 4C:
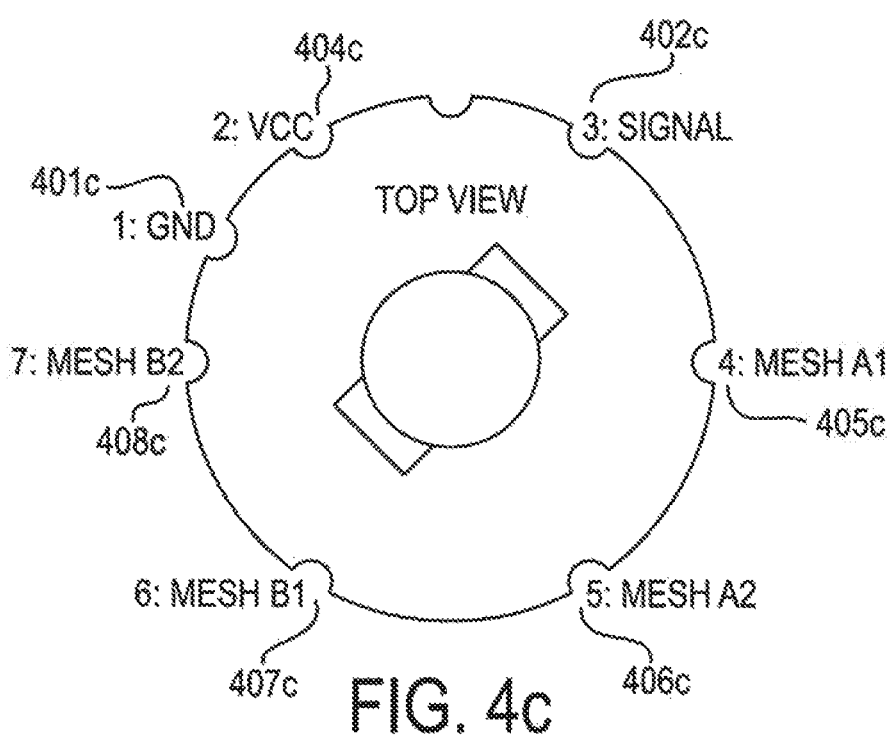

FIGS. 4*b* and 4*c* are schematic top views of two examples of a tamper responsive sensor of the third class of embodiments of the invention, where FIG. 4*b* shows the sensor 200 of FIG. 2*a*. The sensor 200 has electronic inputs/outputs quite similar to the sensor 100 of FIG. 4*a*, with two electric ground connections GND, 401*b*, 403*b*, arranged opposite each other, the VCC power supply 404*b*, arranged in between the two grounds GND 401*b*, 403*b*, and the signal input/output 402*b*, arranged opposite the VCC power supply 404*a*. FIG. 4*c* shows the arrangement of the electronic inputs/outputs of another example of the third class of sensors, which is used to provide protection of a 3rd party PCB, where the 3rd party PCB, which may be denoted a main PCB or bottom board, comprises a mesh of two electrically conductive tracks, where the input/output leading to the first main PCB mesh are MESH A1, 405*c*, and MESH A2, 406*c*, and the input/output leading to the second mesh are MESH B1, 407*c*, and MESH B2, 408*c*.

The intrusion detection is implemented by placing electrical conducting tracks on and in the PCBs of the tamper responsive sensor 100, 110, 200. This is illustrated in FIGS. 5*a*-5*c* and FIGS. 7*a*-7*d*, which are diagrams illustrating the arrangement of electronic components and electrically conductive tracks within embodiments of the third class of sensors, including the sensor 200 of FIGS. 2*a* and 2*b*. It is further illustrated in FIGS. 9*a*-9*d* and FIGS. 11*a*-11*d*, which are diagrams illustrating the arrangement of electronic components and electrically conductive tracks within embodiments of the first and second class of sensors, including the sensor 100 of FIGS. 1*a* and 1*b*, and the sensor 110 of FIG. 1*c*. The tracks may connect to the tamper detecting circuitry or encryption IC 104, which is placed in the secure area of the sensor 100, 110, 200.

Figure 5A:
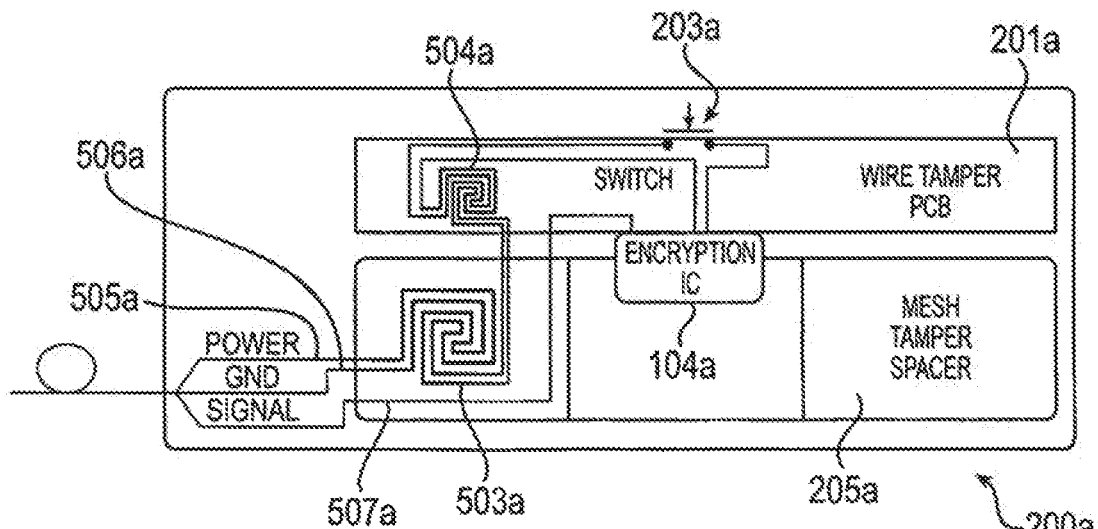
FIGS. 5a-5c are diagrams illustrating the arrangement of electronic components and electrically conductive tracks within three examples of a tamper responsive sensor according to the third class of embodiments of the present invention.
Figure 5B:
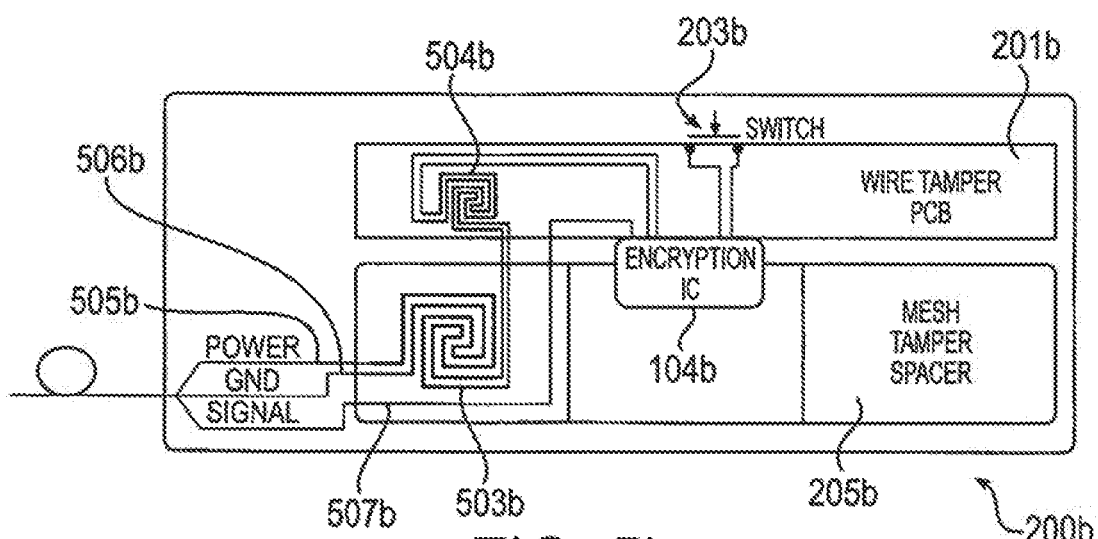
Figure 5C:
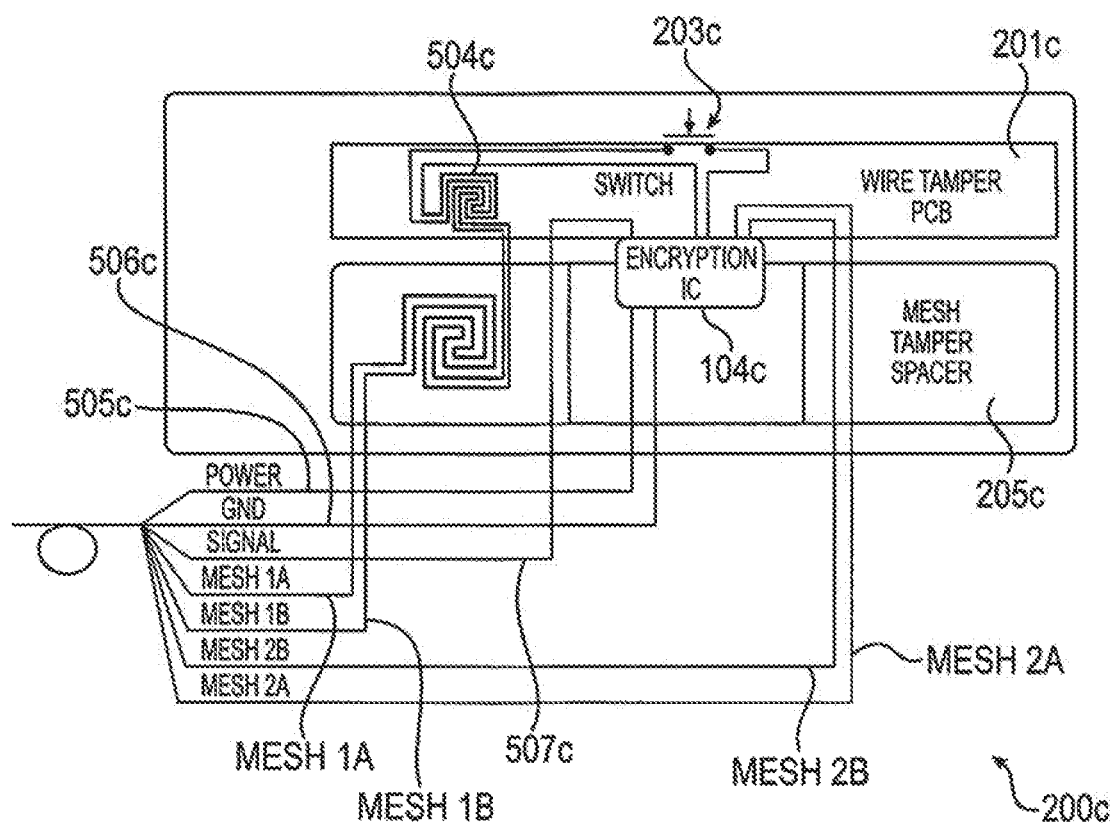

It should be understood that for the sensors of the present invention, the tamper detecting circuitry 104 may be connected to the switch 103, 203 and to one or more of the power lines or signal lines in several different ways or combinations in order to be able to detect an intrusion. Some of these combinations are illustrated in figures discussed in the following. FIGS. 5a-5c are diagrams illustrating a sensor 200 of the type shown in FIGS. 2a and 2b, where the sensor has a carrier PCB or wire tamper PCB, 201a,b,c, a pressure sensitive switch 203a,b,c, and a spacer board PCB or mesh tamper spacer 205a,b,c. For all three sensors of FIGS. 5a-5c, the tracks of the carrier PCB 201a,b,c form a mesh, carrier PCB mesh, 504a,bc, and the tracks of the spacer board 205a,b,c form a mesh, spacer board mesh, 503a,b,c.

For the sensor 200a of FIG. 5a, the signal line 507a is connected directly to the tamper circuitry 104a without being part of any mesh tracks, while both the Power and GND signals, 505a, 506a, are connected to the tamper circuitry 104a via tamper lines holding a spacer board mesh track 503a and carrier PCB mesh track 504a. The tamper line being connected to the Power signal 505a is connected to the circuitry 104 via the tamper sensor or switch 203a. Thus, a first tamper line being connected to the Power signal 505a is defined by a serial connection of the switch 203a, a first track of the carrier PCB mesh 504a, and a first track of the spacer board mesh 503a. A second tamper line being connected to the GND signal 506a is defined by a serial connection of a second track of the carrier PCB mesh 504a, and a second track of the spacer board mesh 503a. It should be understood that it is also within embodiments of the invention that the spacer board 205a is not holding any mesh tracks.

For the sensor 200b of FIG. 5b, the signal line 507b is connected directly to the tamper circuitry 104b without being part of any mesh tracks, while both the Power and GND signals, 505b, 506b, are connected to the tamper circuitry 104b via two tamper lines holding a spacer board mesh track 503b and carrier PCB mesh track 504b. A further tamper line is defined by the switch 203b, where both the input and output of the switch 203b are connected to the circuitry 104b without holding any mesh tracks. Thus, a first tamper line is defined by a signal line holding the switch 203b; a second tamper line being connected to the Power signal 505b is defined by a serial connection of a first track of the carrier PCB mesh 504b, and a first track of the spacer board mesh 503b; and a third tamper line being connected to the GND signal 506a is defined by a serial connection of a second track of the carrier PCB mesh 504b, and a second track of the spacer board mesh 503b. Also here it should be understood that it is within embodiments of the invention that the spacer board 205b is not holding any mesh tracks.

Both sensors 200a, 200b of FIGS. 5a and 5b can be used for providing protection for a 3rd party PCB. However, when using these sensors there will be no tracks or mesh tracks leading from the 3rd party PCB to the tamper circuitry 104, thereby leaving a tamper space open through the 3rd party PCB. FIG. 5c shows a sensor 200c of the same type as the sensors of FIGS. 5a and 5b, but for the sensor 200c, tamper line input/outputs are provided at the spacer board 205c for connecting the tamper line tracks via tracks or mesh tracks of the 3rd party PCB or bottom board. See also the input/output arrangement discussed in connection with FIG. 4c. For the sensor 200c of FIG. 5c, the Power and GND signals 505c, 506c and the signal line 507c are connected directly to the tamper circuitry 104c without being part of any mesh tracks. A first part of a first tamper line is defined by a serial connection going out from a first input/output of the circuitry 104c to the switch 203c, through a first track of the carrier PCB mesh 504c, through a first track of the spacer board mesh 503c, and to a first input/output of the spacer board 205c denoted MESH 1A. A second part of the first tamper line is defined by a serial connection going from a second input/output of the spacer board 205c denoted MESH 2A, through a conductive track of the spacer board 205c, through a conductive track of the carrier PCB 201c, and to a second input/output of the circuitry 104c. A first part of a second tamper line is defined by a serial connection going out from a third input/output of the circuitry 104c through a second track of the carrier PCB mesh 504c, through a second track of the spacer board mesh 503c, and to a third input/output of the spacer board 205c denoted MESH 1B. A second part of the second tamper line is defined by a serial connection going from a fourth input/output of the spacer board 205c denoted MESH 2B, through a conductive track of the spacer board 205c, through a conductive track of the carrier PCB 201c, and to a fourth input/output of the circuitry 104c. In order to have the first and second tamper lines working properly, the MESH 1A and MESH 2A input/outputs have to be connected via tracks or mesh tracks of the 3rd party PCB or bottom board, and similarly, the MESH 1B and MESH 2B input/outputs have to be connected via tracks or mesh tracks of the 3rd party PCB or bottom board. The conductive tracks of the second parts of the first and second tamper lines may also be part of mesh tracks. The different mesh tracks may be routed in a serpentine like pattern.

Figure 6A:
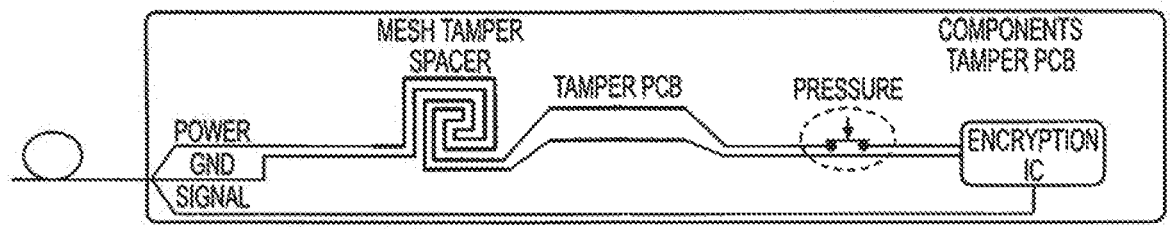
FIGS. 6a-6e illustrate different operational states of the electronic circuitry illustrated in FIG. 5a, FIGS. 6f-6j illustrate different operational states of the electronic circuitry of a sensor being a first alternative to the sensor of FIG. 5a, FIGS. 6k-6o illustrate different operational states of the electronic circuitry of a sensor being a second alternative to the sensor of FIG. 5a, FIGS. 7a-7d are diagrams illustrating the arrangement of electronic components and electrically conductive tracks within four examples of a tamper responsive sensor according to the third class of embodiments of the present invention.
Figure 6B:
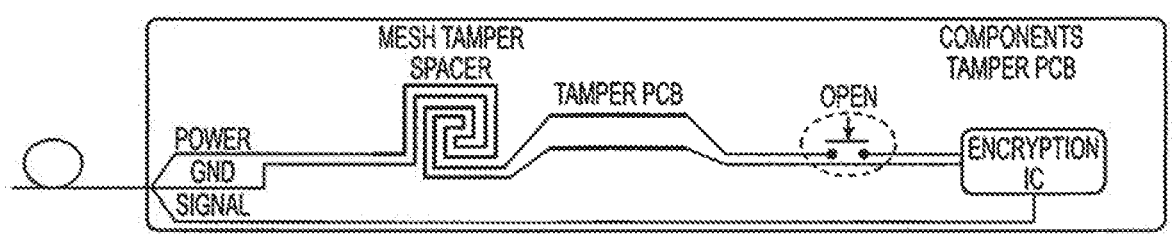
Figure 6C:
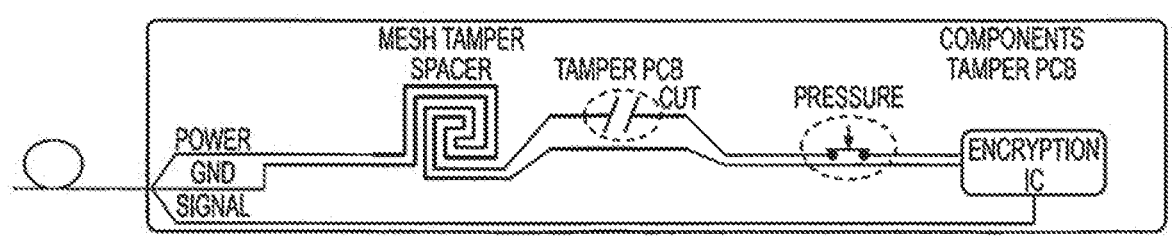
Figure 6D:
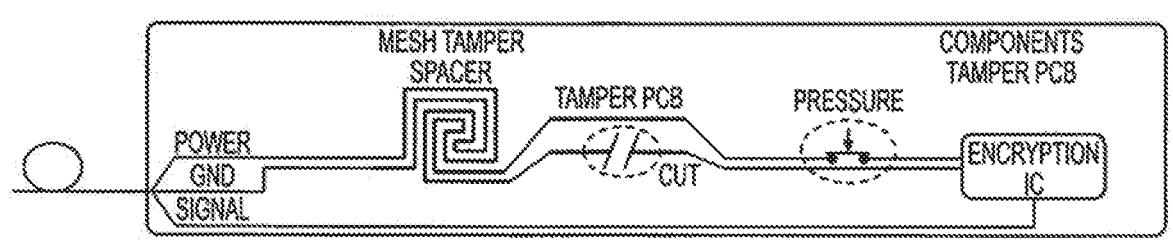
Figure 6E:
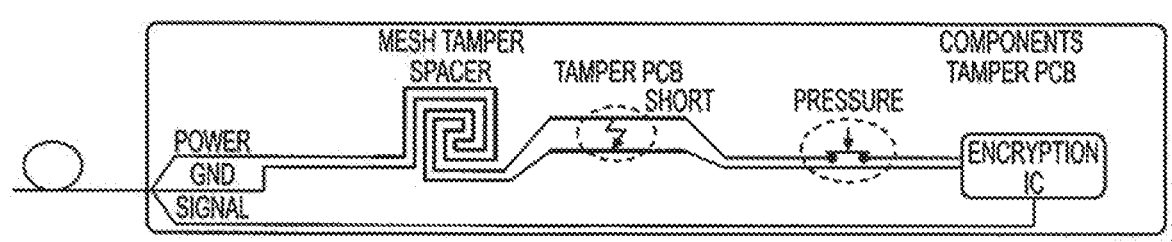

FIGS. 6a-6e illustrate different operational states of the electronic circuitry illustrated in FIG. 5a. FIG. 6a illustrates the normal working state with the switch 103a in the closed position and power being supplied to the encryption IC 104a. FIG. 6b illustrates a disassembly situation, where the power supply to the circuit 104a is cut by the switch 103a, which is now in the open position. The encryption IC 104a can detect an interruption of either of the tamper lines holding mesh tracks 503a, 504a, a short circuit between the first and second tamper lines, or a short circuit between a tamper line and any other signal. FIG. 6c illustrates the situation where there is loss of power to the circuit 104a due to a cut or break in the first tamper line holding the power signal, FIG. 6d illustrates the situation where there is loss of power to the circuit 104a due to a cut or break in the second tamper line holding the GND signal, and FIG. 6e illustrates the situation where there is loss of power to the circuit 104a due to a short between the first and second tamper lines.

Figure 6F:
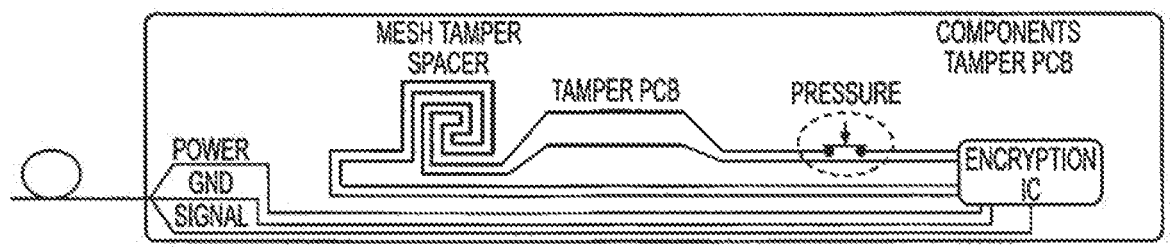
Figure 6G:
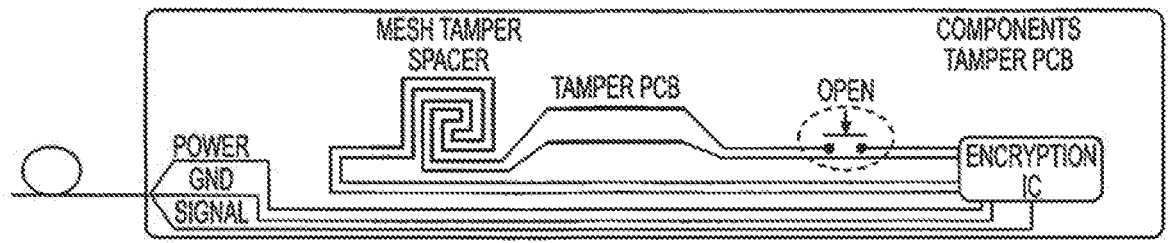
Figure 6H:
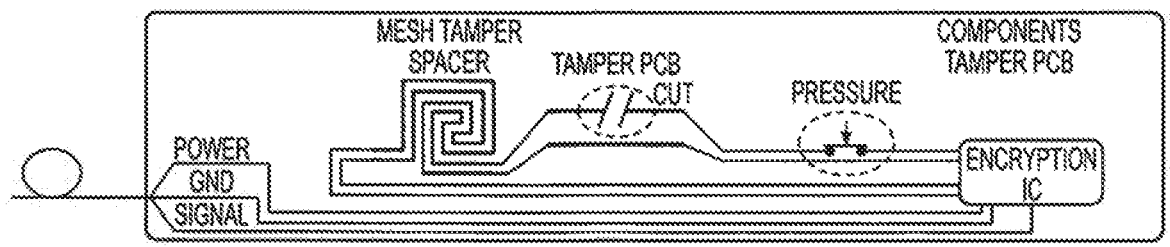
Figure 6I:
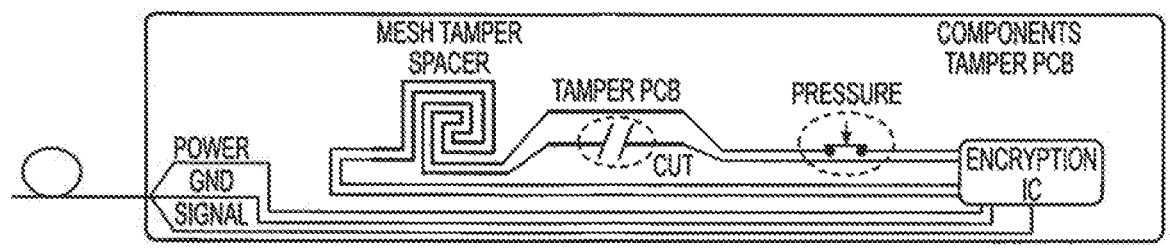
Figure 6J:
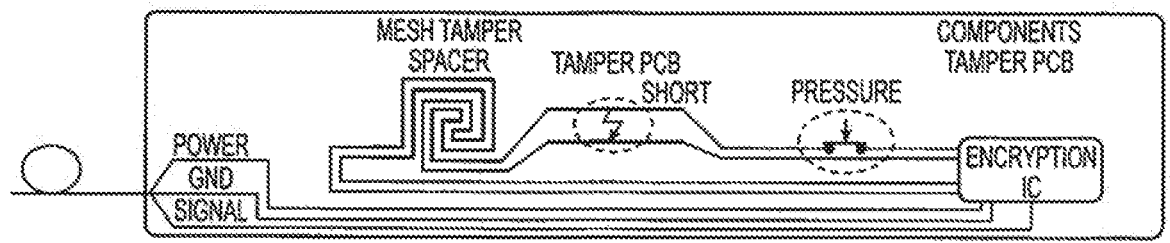

FIGS. 6f-6j illustrate different operational states of the electronic circuitry for a sensor having an alternative arrangement of the tamper lines when compared to the sensor of FIG. 5a. For the sensor of FIGS. 6f-6j, a first tamper line is defined by going from the tamper circuitry 104a through the switch 203a, through a first track of the carrier PCB mesh 504a, through a first track of the spacer board mesh 503a, and back to the tamper circuitry 104a. A second tamper line is defined by going from the tamper circuitry 104a through a second track of the carrier PCB mesh 504a, through a second track of the spacer board mesh 503a, and back to the tamper circuitry 104a. FIG. 6f illustrates the normal working state with the switch 103a in the closed position. FIG. 6g illustrates a disassembly situation, where the signal line from the circuit 104a through the first tamper fine is cut by the switch 103a, which is now in the open position. FIG. 6h illustrates the situation where the signal line from the circuit 104a through the first tamper line is cut due to a cut or break in the first tamper line. FIG. 6d illustrates the situation where the signal line from the circuit 104a through the second tamper line is cut due to a cut or break in the second tamper line. FIG. 6e illustrates the situation where there is an interruption of the signal through the first and second tamper lines due to a short between the first and second tamper lines.

Figure 6K:
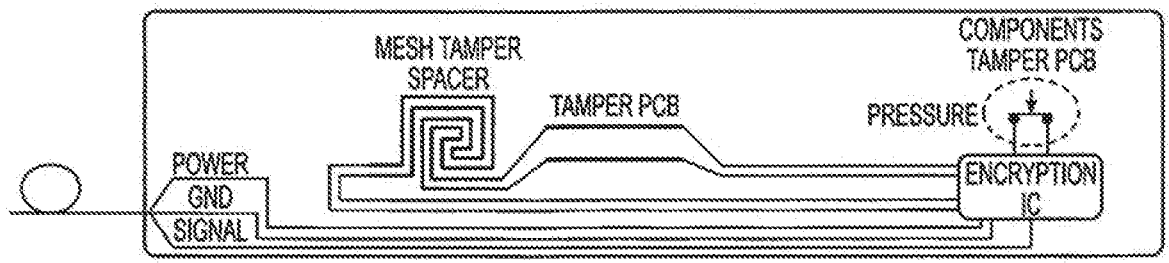
Figure 6L:
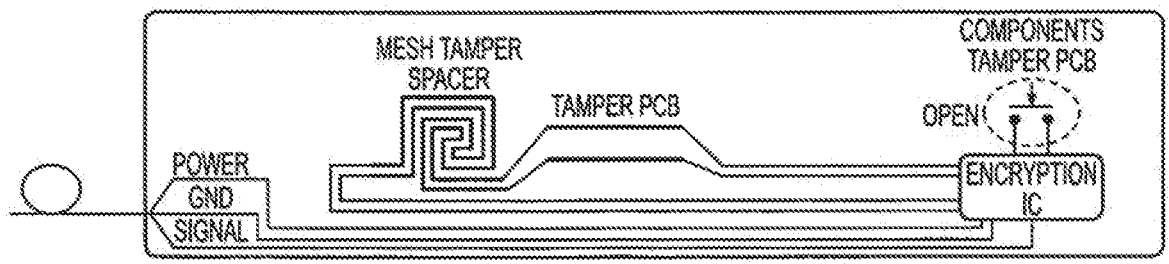
Figure 6M:
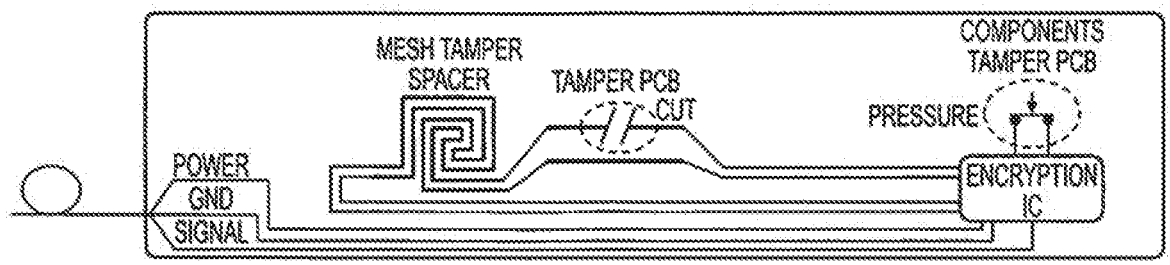
Figure 6N:
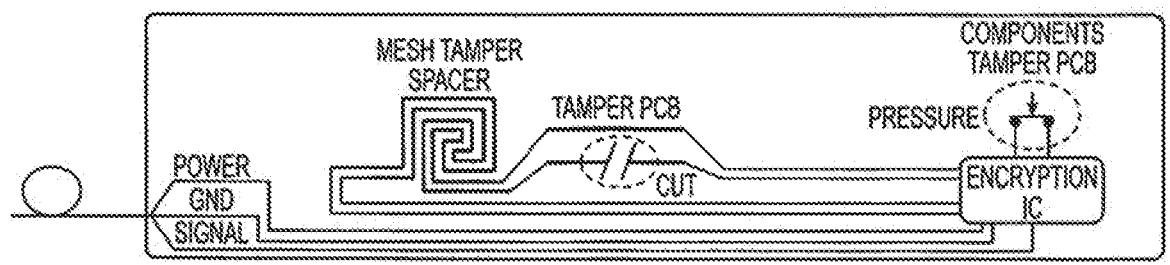
Figure 6O:
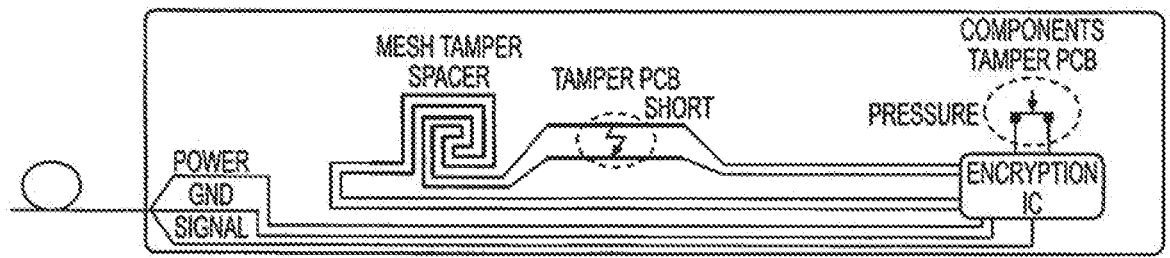

FIGS. 6k-6o illustrate different operational states of the electronic circuitry for a sensor having another alternative arrangement of the tamper lines when compared to the sensor of FIG. 5a. For the sensor of FIGS. 6k-6o, a first tamper line is defined by going from the tamper circuitry 104a through the switch 203a and back to the tamper circuitry 104a. A second tamper line is defined by going from the tamper circuitry 104a through a first track of the carrier PCB mesh 504a, through a first track of the spacer board mesh 503a, and back to the tamper circuitry 104a. A third tamper line is defined by going from the tamper circuitry 104a through a second track of the carrier PCB mesh 504a, through a second track of the spacer board mesh 503a, and back to the tamper circuitry 104a. FIG. 6k illustrates the normal working state with the switch 103a in the closed position. FIG. 6l illustrates a disassembly situation, where the signal line from the circuit 104a through the first tamper line is cut by the switch 103a, which is now in the open position. FIG. 6m illustrates the situation where the signal line from the circuit 104a through the second tamper line is cut due to a cut or break in the second tamper line. FIG. 6n illustrates the situation where the signal line from the circuit 104a through the third tamper line is cut due to a cut or break in the third tamper line. FIG. 6o illustrates the situation where there is an interruption of the signal through the second and third tamper lines due to a short between the second and third tamper lines.

FIGS. 7a-7d are diagrams illustrating a sensor having a carrier PCB 201a,b,c,d with a tamper switch 203a,b,c,d and a tamper detecting circuitry 104a,b,c,d, where the carrier PCB 201a,b,c,d is arranged on a spacer board 205a,b,c,d. Furthermore, the spacer board 205a,b,c,d is secured to a bottom board or main PCB 711a,b,c,d, which may be a 3rd party PCB 301, as illustrated in FIG. 3c. The carrier PCB 201a,b,c,d has a carrier PCB mesh 704a,b,c,d, the spacer board 205a,b,c,d has a spacer board mesh 703a,b,c,d, and the bottom board has a bottom board mesh 710a,b,c,d.

Figure 7A:
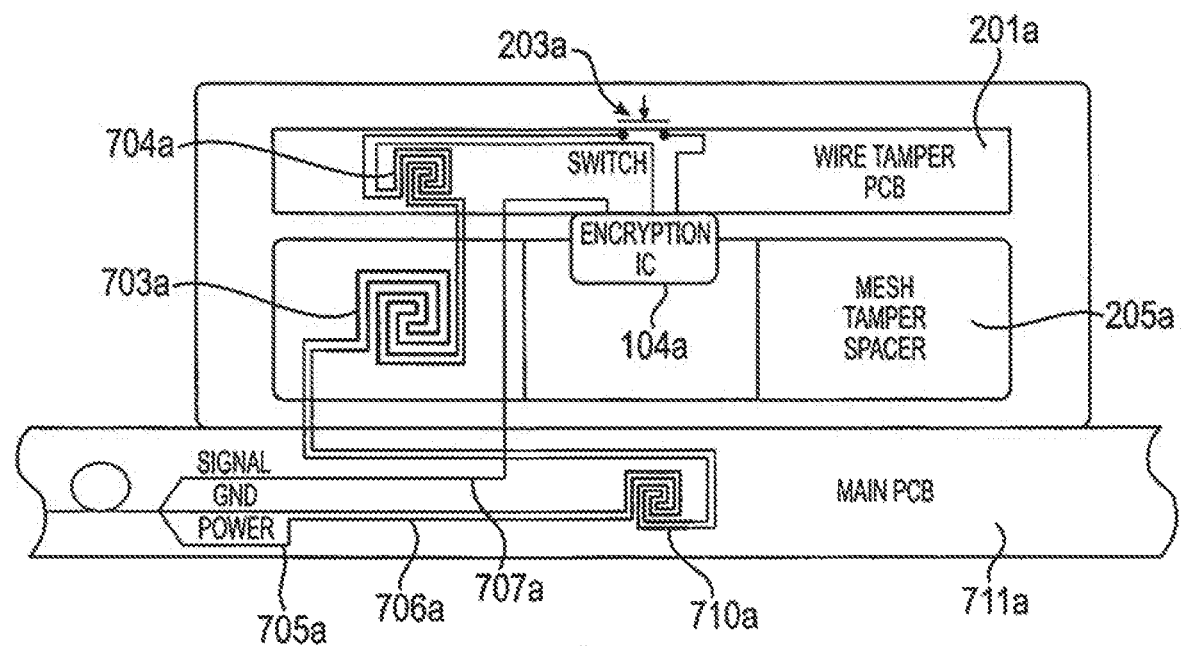

For the sensor of FIG. 7a, the signal line 707a is connected directly to the tamper circuitry 104a without being part of any mesh tracks, while both the Power and GND signals, 705a, 706a, are connected to the tamper circuitry 104a via tamper lines holding a spacer board mesh track 703a, a carrier PCB mesh track 704a, and a bottom board mesh track 710a. The tamper line being connected to the Power signal 705a is connected to the circuitry 104a via the tamper sensor or switch 203a. Thus, a first tamper line being connected to the GND signal 706a is defined by a serial connection of the switch 203a, a first track of the carrier PCB mesh 704a, a first track of the spacer board mesh 703a, and a first track of the bottom board mesh 710a. A second tamper line being connected to the Power signal 705a is defined by a serial connection of a second track of the carrier PCB mesh 704a, a second track of the spacer board mesh 703a, and a second track of the bottom board mesh 710a.

Figure 7B:
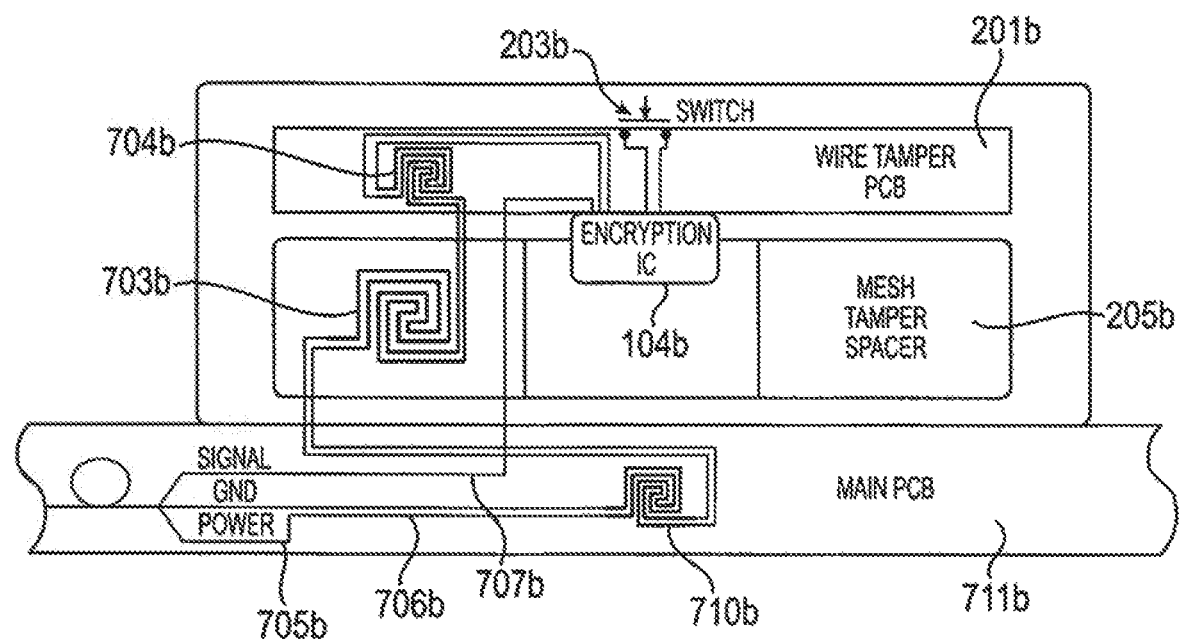

For the sensor of FIG. 7b, the signal line 707b is connected directly to the tamper circuitry 104b without being part of any mesh tracks, while both the Power and GND signals, 705b, 706b, are connected to the tamper circuitry 104b via two tamper lines. A further tamper line is defined by the switch 203b, where both the input and output of the switch 203b are connected to the circuitry 104b without holding any mesh tracks. Thus, a first tamper line is defined by a signal line holding the switch 203b; a second tamper line being connected to the Power signal 705b is defined by a serial connection of a first track of the carrier PCB mesh 704b, a first track of the spacer board mesh 703b, and a first track of the bottom board mesh 710b; and a third tamper line being connected to the GND signal 706a is defined by a serial connection of a second track of the carrier PCB mesh 704b, a second track of the spacer board mesh 703b, and a second track of the bottom board mesh 710c.

Figure 7C:
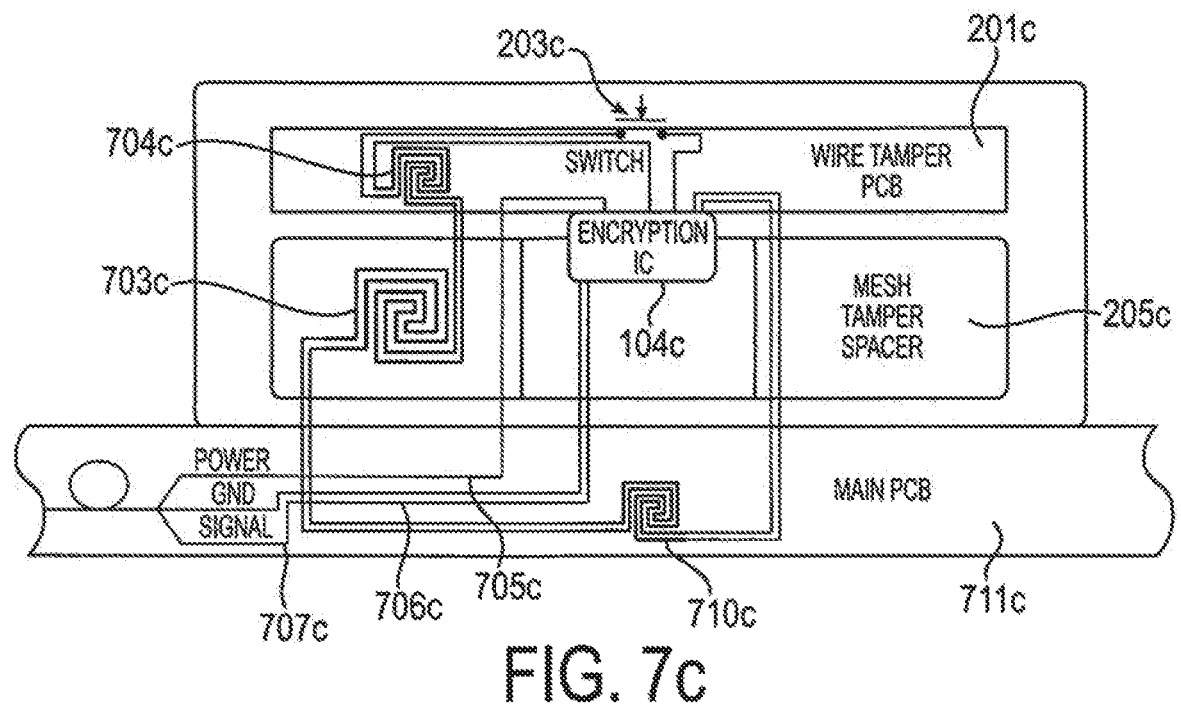
Figure 7D:
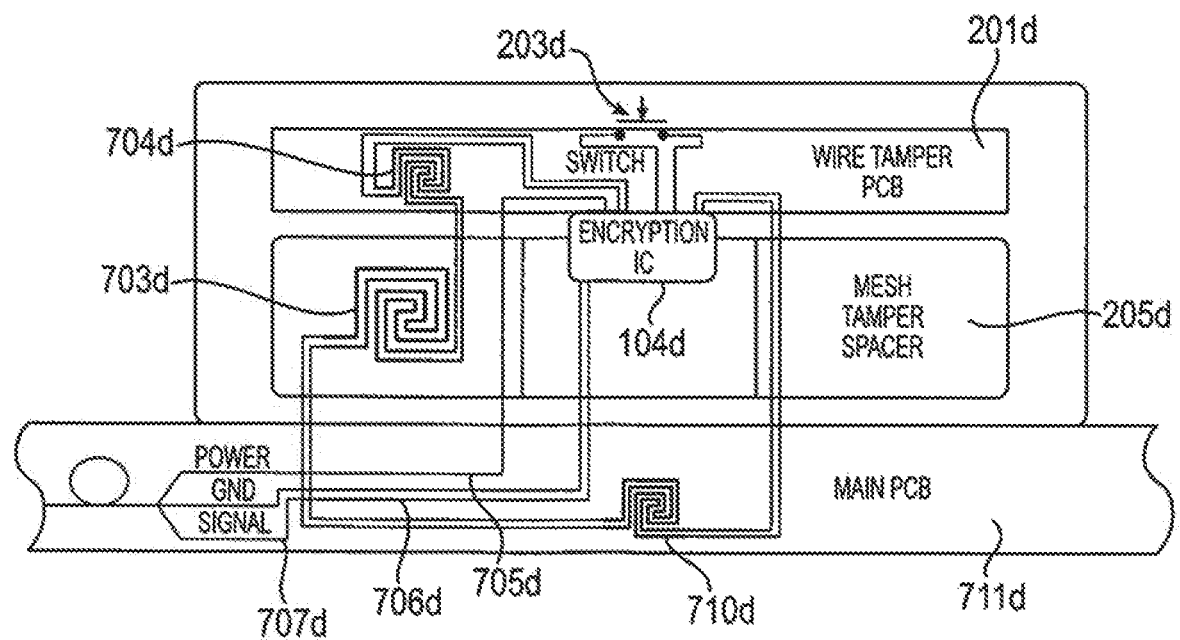

For the sensors of FIGS. 7c and 7d, the Power and GND signals, 705c,d and 706c,d, and the signal line 707c,d are connected directly to the tamper circuitry 104c,d without being part of any mesh tracks. For the sensor of FIG. 7c, a first tamper line is defined by a serial connection going out from a first input/output of the circuitry 104c to the switch 203c, through a first track of the carrier PCB mesh 704c, through a first track of the spacer board mesh 703c, through a first track of the bottom board mesh 710c, through tracks of the spacer board and the carrier PCB and back to a second input/output of the circuitry 104c. A second tamper line is defined by a serial connection going out from a third input/output of the circuitry 104c through a second track of the carrier PCB mesh 704c, through a second track of the spacer board mesh 703c, through a second track of the bottom board mesh 710c, through tracks of the spacer board and the carrier PCB back to a fourth input/output of the circuitry 104c. For the sensor of FIG. 7d, a first tamper line is defined by a serial connection going out from a first input/output of the circuitry 104d to the switch 203d and back to a second input/output of the circuitry 104d. A second tamper line is defined by a serial connection going out from a third input/output of the circuitry 104d, through a first track of the carrier PCB mesh 704d, through a first track of the spacer board mesh 703d, through a first track of the bottom board mesh 710d, through tracks of the spacer board and the carrier PCB and back to a fourth input/output of the circuitry 104d. A third tamper line is defined by a serial connection going out from a fifth input/output of the circuitry 104d through a second track of the carrier PCB mesh 704d, through a second track of the spacer board mesh 703d, through a second track of the bottom board mesh 710d, through tracks of the spacer board and the carrier PCB and back to a sixth input/output of the circuitry 104d.

Figure 8A:
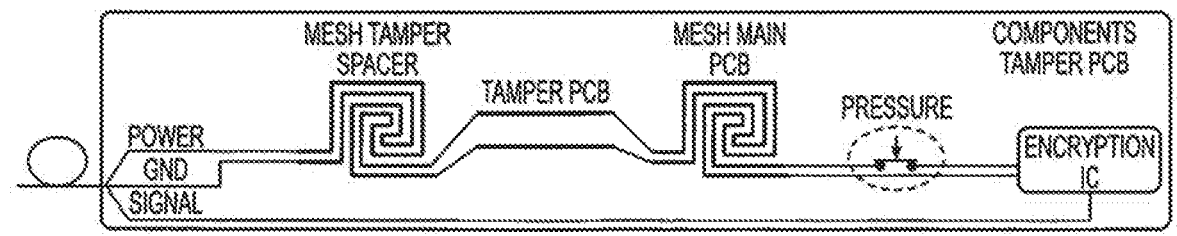
FIGS. 8a-8e illustrate different operational states of the electronic circuitry illustrated in FIG. 7a, FIGS. 8f-8j illustrate different operational states of the electronic circuitry illustrated in FIG. 7c, FIGS. 8k-8o illustrate different operational states of the electronic circuitry illustrated in FIG. 7d, FIGS. 9a-9d are diagrams illustrating the arrangement of electronic components and electrically conductive tracks within four examples of a tamper responsive sensor according to the first class of embodiments of the present invention.
Figure 8B:
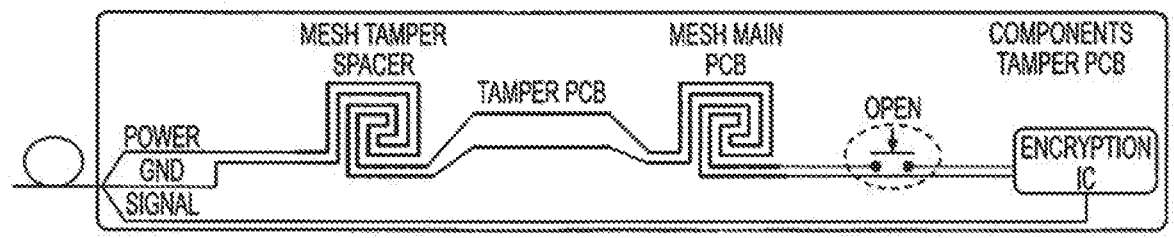
Figure 8C:
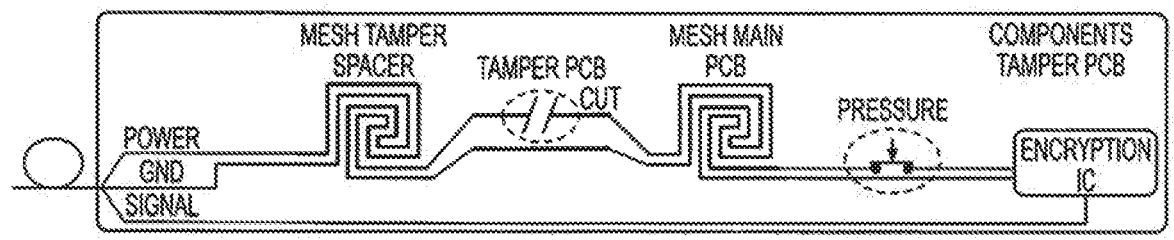
Figure 8D:
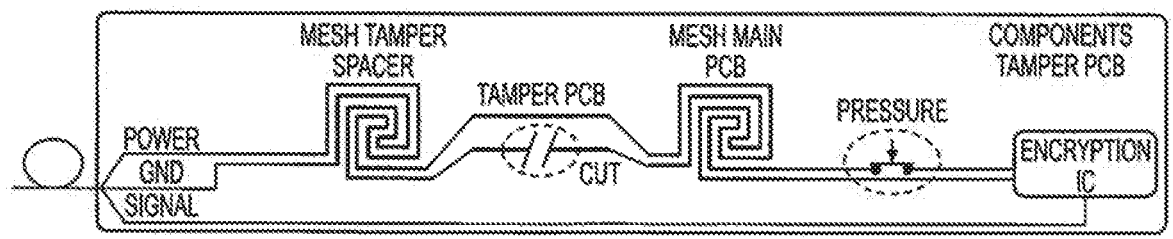
Figure 8E:
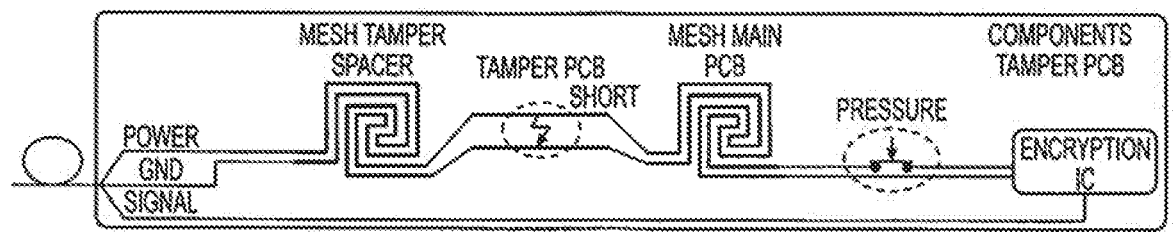

FIGS. 8a-8e illustrate different operational states of the electronic circuitry illustrated in FIG. 7a. FIG. 8a illustrates the normal working state with the switch 103a in the closed position and power being supplied to the encryption IC 104a. FIG. 8b illustrates a disassembly situation, where the power supply to the circuit 104a is cut by the switch 103a, which is now in the open position. FIG. 8c illustrates the situation where there is loss of power to the circuit 104a due to a cut or break in the first tamper line holding the power signal. FIG. 8d illustrates the situation where there is loss of power to the circuit 104a due to a cut or break in the second tamper line holding the GND signal, and FIG. 8e illustrates the situation where there is loss of power to the circuit 104a due to a short between the first and second tamper lines.

Figure 8F:
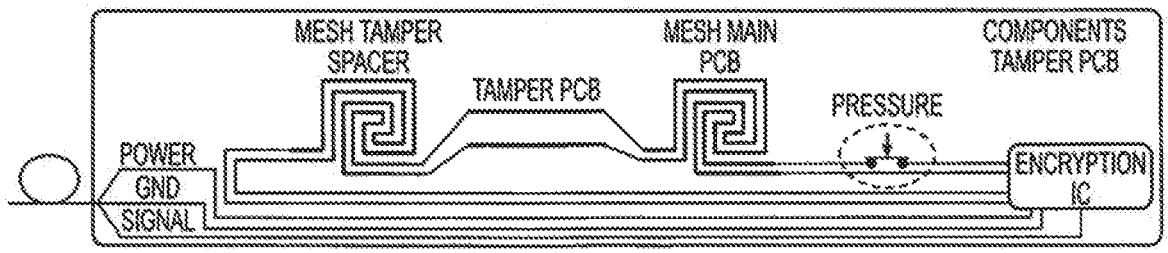
Figure 8G:
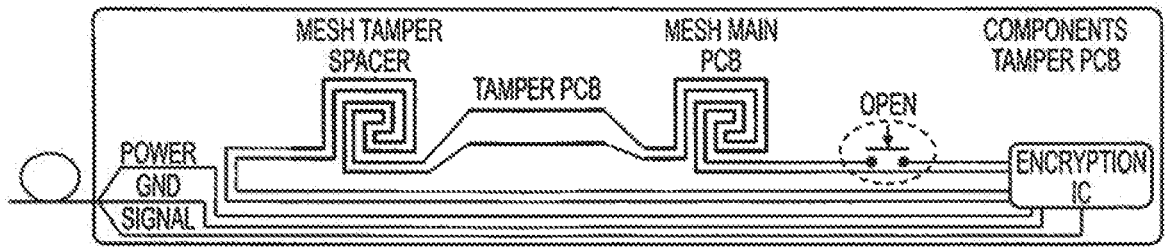
Figure 8H:
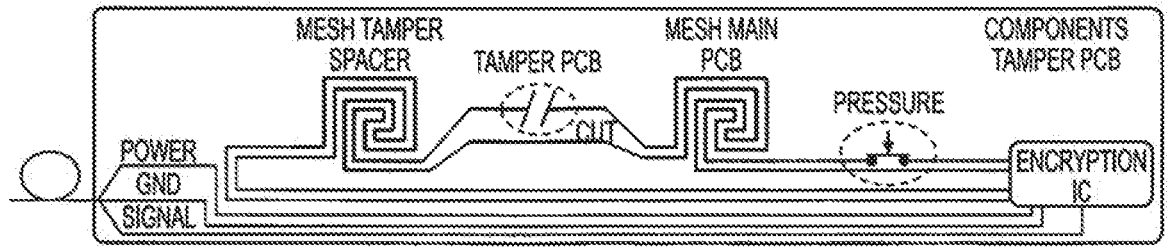
Figure 8I:
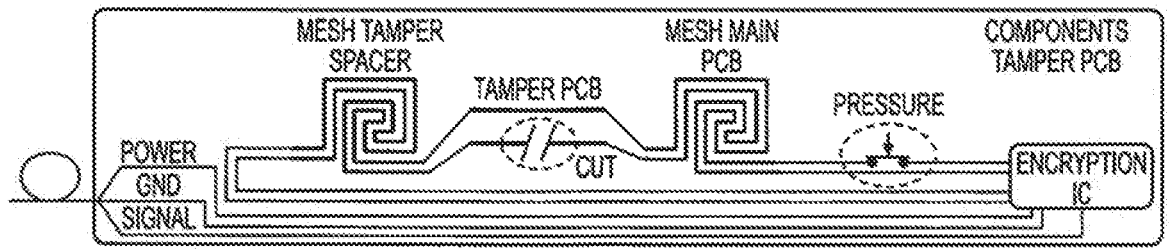
Figure 8J:
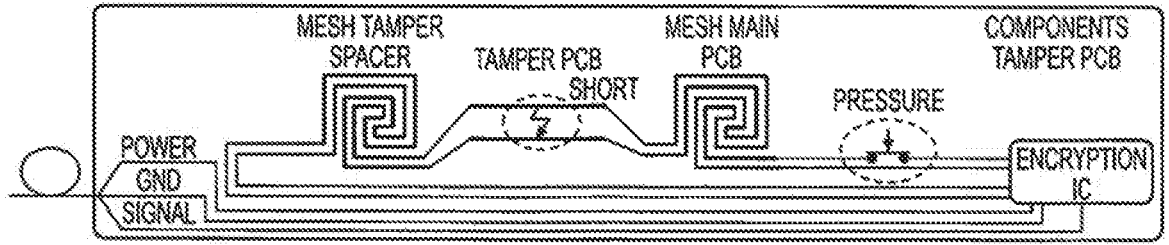

FIGS. 8f-8j illustrate different operational states of the electronic circuitry illustrated in FIG. 7c. FIG. 8f illustrates the normal working state with the switch 103c in the closed position. FIG. 8g illustrates a disassembly situation, where the signal line from the circuit 104c through the first tamper line is cut by the switch 103c, which is now in the open position. FIG. 8h illustrates the situation where the signal line from the circuit 104c through the first tamper line is cut due to a cut or break in the first tamper line. FIG. 8i illustrates the situation where the signal line from the circuit 104c through the second tamper line is cut due to a cut or break in the second tamper line. FIG. 8j illustrates the situation where there is an interruption of the signal through the first and second tamper lines due to a short between the first and second tamper lines.

Figure 8K:
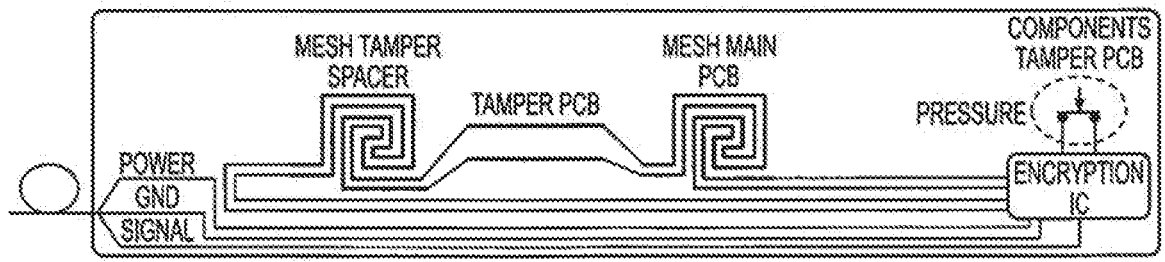
Figure 8L:
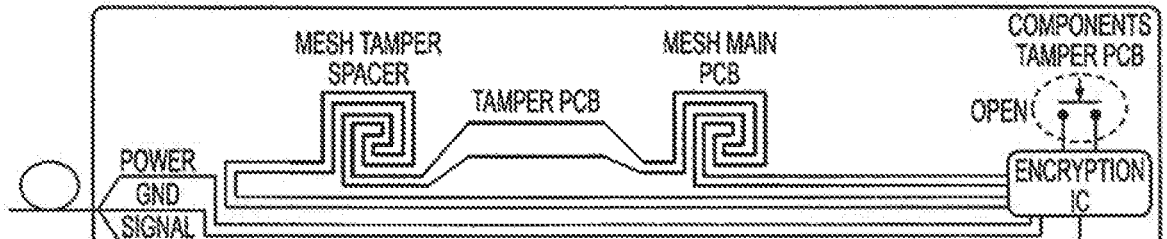
Figure 8M:
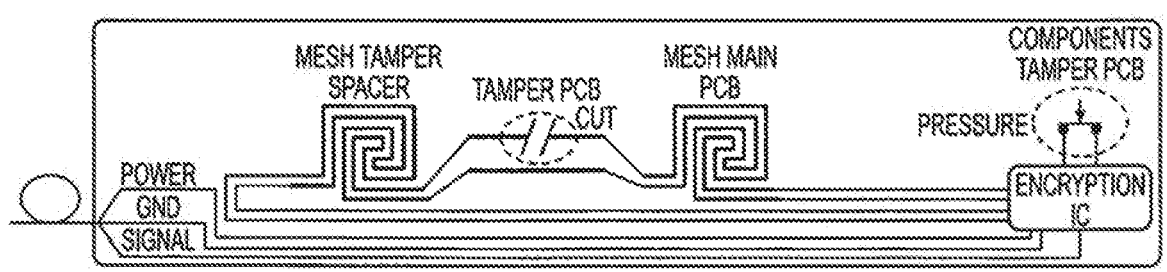
Figure 8N:
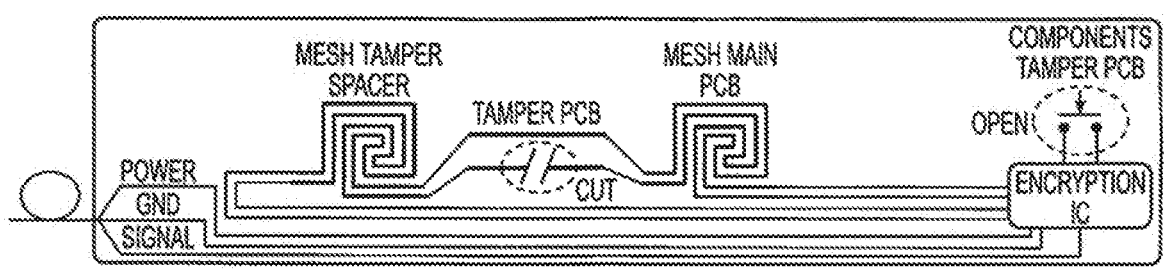
Figure 8O:
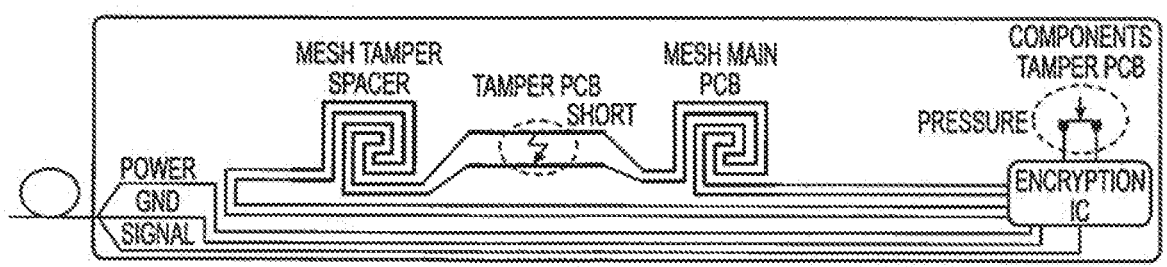

FIGS. 8k-8o illustrate different operational states of the electronic circuitry illustrated in FIG. 7d. FIG. 8k illustrates the normal working state with the switch 103d in the closed position. FIG. 8l illustrates a disassembly situation, where the signal line from the circuit 104d through the first tamper line is cut by the switch 103d, which is now in the open position. FIG. 8m illustrates the situation where the signal line from the circuit 104d through the second tamper line is cut due to a cut or break in the second tamper line. FIG. 8n illustrates the situation where the signal line from the circuit 104d through the third tamper line is cut due to a cut or break in the third tamper line. FIG. 8o illustrates the situation where there is an interruption of the signal through the second and third tamper lines due to a short between the second and third tamper lines.

FIGS. 9a-9d are diagrams illustrating the arrangement of electronic components and electrically conductive tracks within four examples of a tamper responsive sensor according to the first class of embodiments of the present invention, including the sensor 100 of FIGS. 1a and 1b. The sensors of FIGS. 9a-9d each has a tamper membrane or foil 102a,b,c,d on top of the carrier PCB or wire tamper PCB 101a,b,c,d, where the tamper foil 102a,b,c,d holds a top membrane mesh 901a,b,c,d.

Figure 9B:
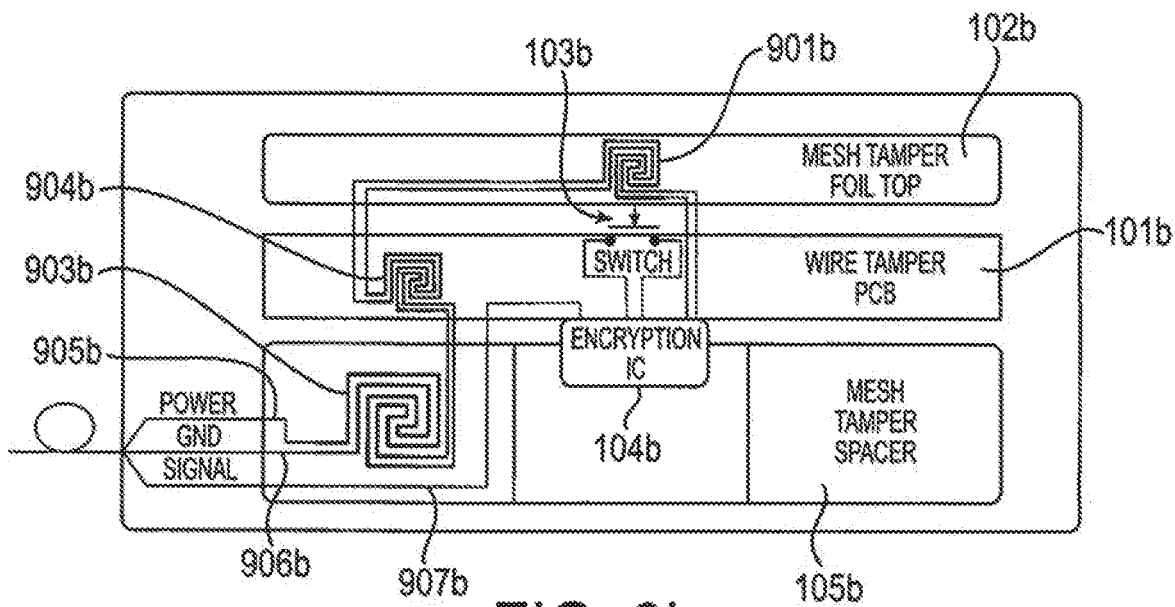

For the sensors of FIGS. 9a and 9b, the signal line 907a,b is connected directly to the tamper circuitry 104a,b without being part of any mesh tracks, while both the Power and GND signals, 905a,b and 906a,b, are connected to the tamper circuitry 104a,b via tamper lines. For the sensor of FIG. 9a, a first tamper line being connected to the Power signal 905a is defined by a serial connection of the switch 103a, a first track of the top membrane mesh 901a, a first track of the carrier PCB mesh 904a, and a first track of the spacer board mesh 903a. A second tamper line being connected to the GND signal 906a is defined by a serial connection of a second track of the top membrane mesh 901a, a second track of the carrier PCB mesh 904a, and a second track of the spacer board mesh 903a. For the sensor of FIG. 9b, a first tamper line is defined by a serial connection going out from a first input/output of the circuitry 104b to the switch 103b and back to a second input/output of the circuitry 104b, a second tamper line being connected to the Power signal 905b is defined by a serial connection of a first track of the top membrane mesh 901b, a first track of the carrier PCB mesh 904b, and a first track of the spacer board mesh 903b. A third tamper line connected to the GND signal 906b is defined by a serial connection of a second track of the top membrane mesh 901b, a second track of the carrier PCB mesh 904b, and a second track of the spacer board mesh 903b.

Figure 9C:
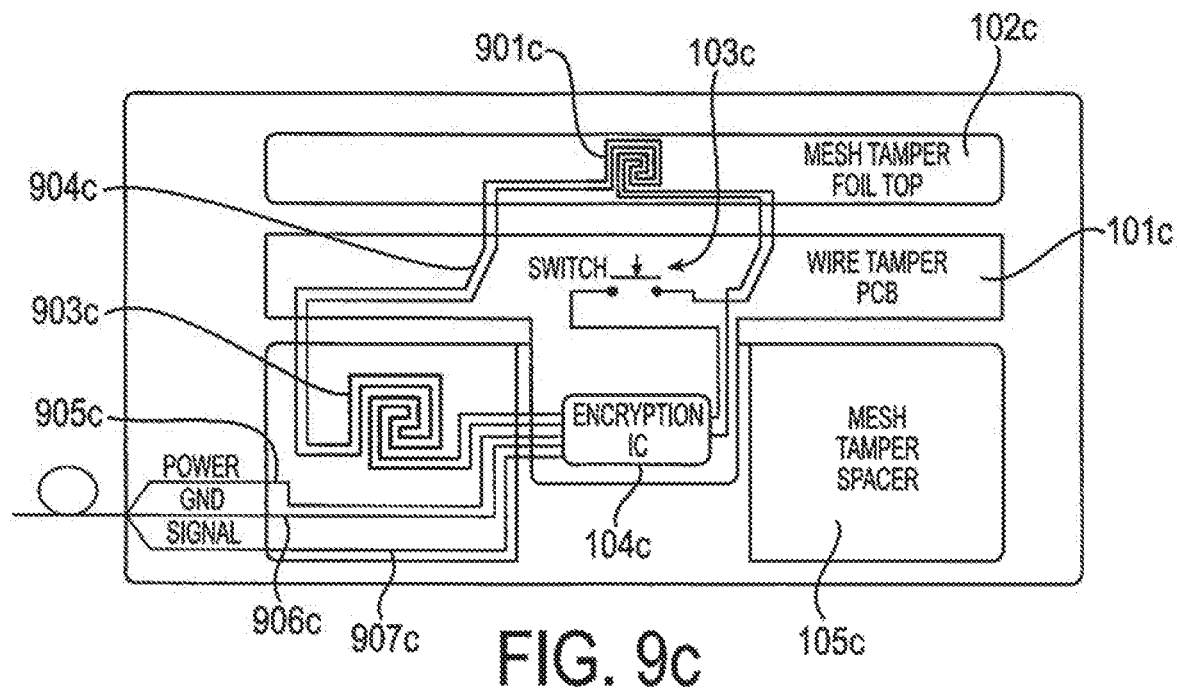
Figure 9D:
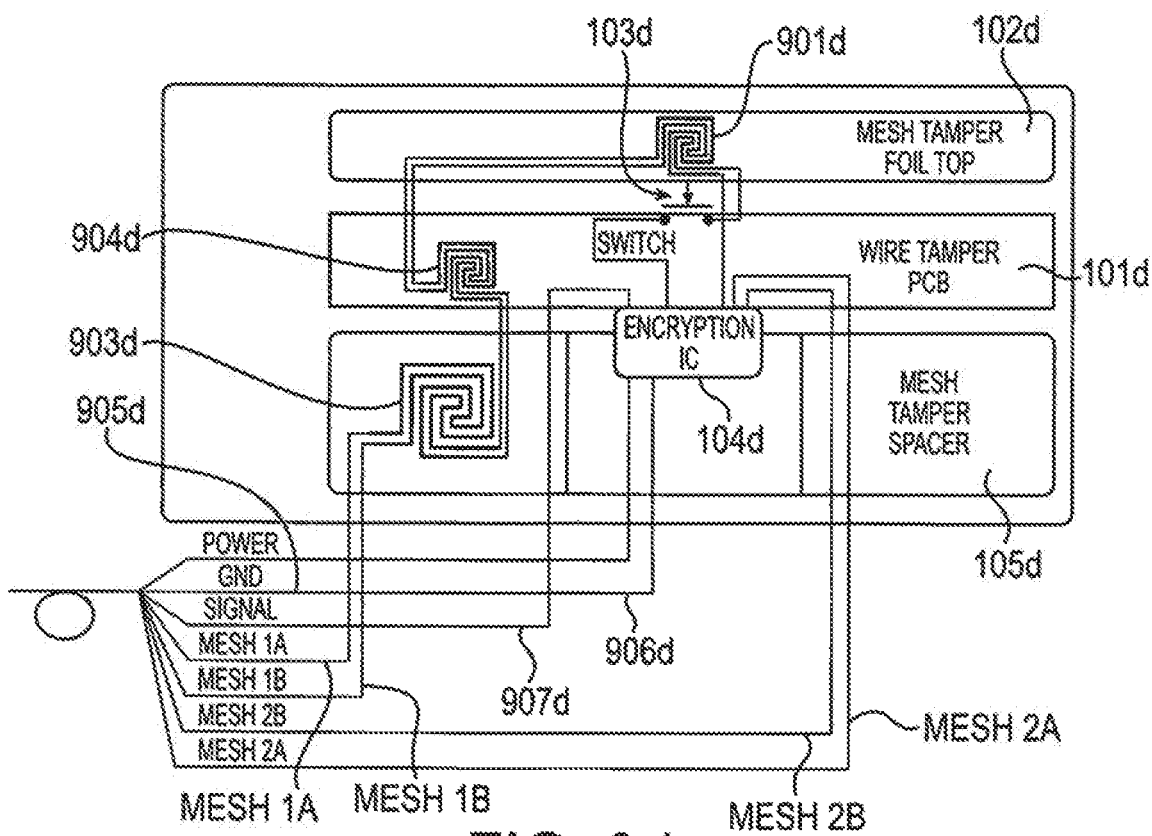

For the sensors of FIGS. 9c and 9d, the Power and GND signals, 905c,d and 906c,d, and the signal line 907c,d are connected directly to the tamper circuitry 104c,d without being part of any mesh tracks. For the sensor of FIG. 9c, a first tamper line is defined by a serial connection going out from a first input/output of the circuitry 104c to the switch 103c, through a first track of the top membrane mesh 901c, through a first track of the carrier PCB mesh 904c, through a first track of the spacer board mesh 903c, through tracks of the spacer board and the carrier PCB and back to a second input/output of the circuitry 104c. A second tamper line is defined by a serial connection going out from a third input/output of the circuitry 104c, through a second track of the top membrane mesh 901c, through a second track of the carrier PCB mesh 904c, through a second track of the spacer board mesh 9703c, through tracks of the spacer board and the carrier PCB back to a fourth input/output of the circuitry 104c.

For the sensor of FIG. 9d, a first part of a first tamper line is defined by a serial connection going out from a first input/output of the circuitry 104d to the switch 103d, through a first track of the top membrane mesh 901d, through a first track of the carrier PCB mesh 904d, through a first track of the spacer board mesh 903d, and to a first input/output of the spacer board 105d denoted MESH 1A. A second part of the first tamper line is defined by a serial connection going from a second input/output of the spacer board 105d denoted MESH 2A, through a conductive track of the spacer board 105d, through a conductive track of the carrier PCB 101d, and to a second input/output of the circuitry 104d. A first part of a second tamper line is defined by a serial connection going out from a third input/output of the circuitry 104d, through a second track of the top membrane mesh 901d, through a second track of the carrier PCB mesh 904d, through a second track of the spacer board mesh 903d, and to a third input/output of the spacer board 105d denoted MESH 1B. A second part of the second tamper line is defined by a serial connection going from a fourth input/output of the spacer board 105d denoted MESH 2B, through a conductive track of the spacer board 105d, through a conductive track of the carrier PCB 101d, and to a fourth input/output of the circuitry 104d. In order to have the first and second tamper lines working properly, the MESH 1A and MESH 2A input/outputs have to be connected via tracks or mesh tracks of a 3rd party PCB or bottom board, and similarly, the MESH 1B and MESH 2B input/outputs have to be connected via tracks or mesh tracks of the 3rd party PCB or bottom board. The conductive tracks of the second parts of the first and second tamper lines may also be part of mesh tracks.

Figure 10A:
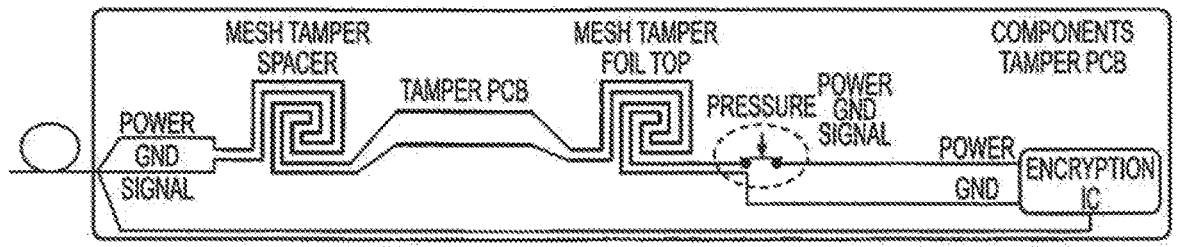
FIGS. 10a-10e illustrate different operational states of the electronic circuitry illustrated in FIG. 9a, FIGS. 11a-11d are diagrams illustrating the arrangement of electronic components and electrically conductive tracks within four examples of a tamper responsive sensor according to the second class of embodiments of the present invention.
Figure 10B:
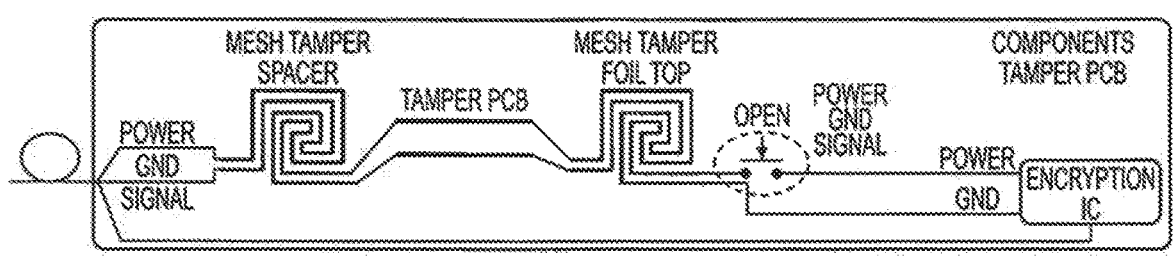
Figure 10C:
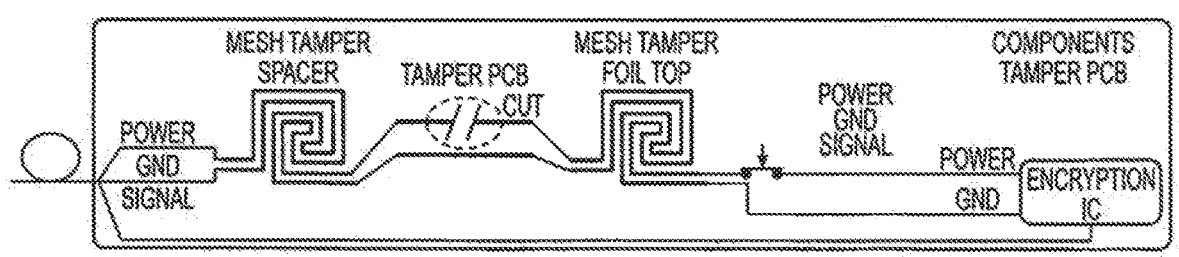
Figure 10D:
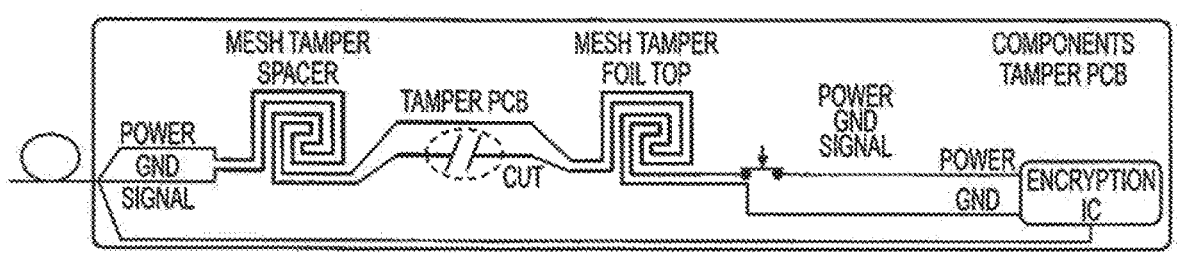
Figure 10E:
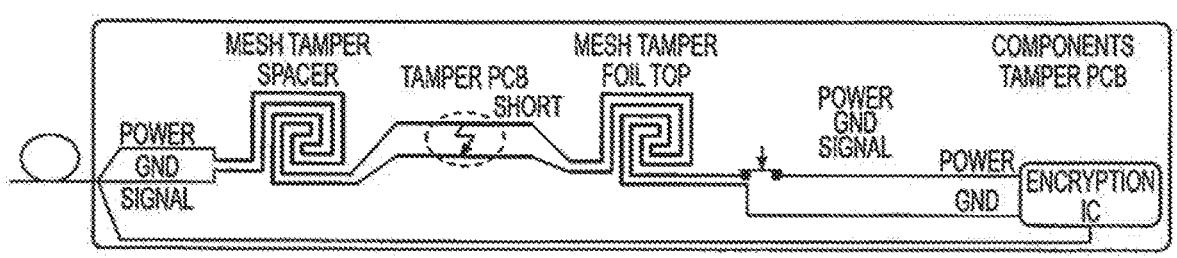

FIGS. 10a-10e illustrate different operational states of the electronic circuitry illustrated in FIG. 9a. FIG. 10a illustrates the normal working state with the switch 103a in the closed position and power being supplied to the encryption IC 104a. FIG. 10b illustrates a disassembly situation, where the power supply to the circuit 104a is cut by the switch 103a, which is now in the open position. FIG. 10c illustrates the situation where there is loss of power to the circuit 104a due to a cut or break in the first tamper line holding the power signal. FIG. 10d illustrates the situation where there is loss of power to the circuit 104a due to a cut or break in the second tamper line holding the GND signal, and FIG. 10e illustrates the situation where there is loss of power to the circuit 104a due to a short between the first and second tamper lines.

FIGS. 11a-11d are diagrams illustrating the arrangement of electronic components and electrically conductive tracks within four examples of a tamper responsive sensor according to the second class of embodiments of the present invention, including the sensor 110 of FIG. 1c. The sensors of FIGS. 11a-11d each has a carrier PCB 101a,b,c,d arranged on a spacer board 105a,b,c,d with a tamper membrane or foil 102a,b,c,d on top of the carrier PCB 101a,b,c,d, and a bottom PCB board or bottom membrane 1111a,b,c,d, which can be a flexible membrane, at the bottom of the spacer board 105a,b,c,d. The top tamper foil 102a,b,c,d holds a top membrane mesh 1101a,b,c,d, the carrier PCB 101a,b,c,d holds a carrier PCB mesh 1104a,b,c,d, the spacer board 105a,b,c,d holds a spacer board mesh 1103a,b,c,d, and the bottom board or membrane 1111a,b,c,d holds a bottom board mesh 1110a,b,c,d.

Figure 11A:
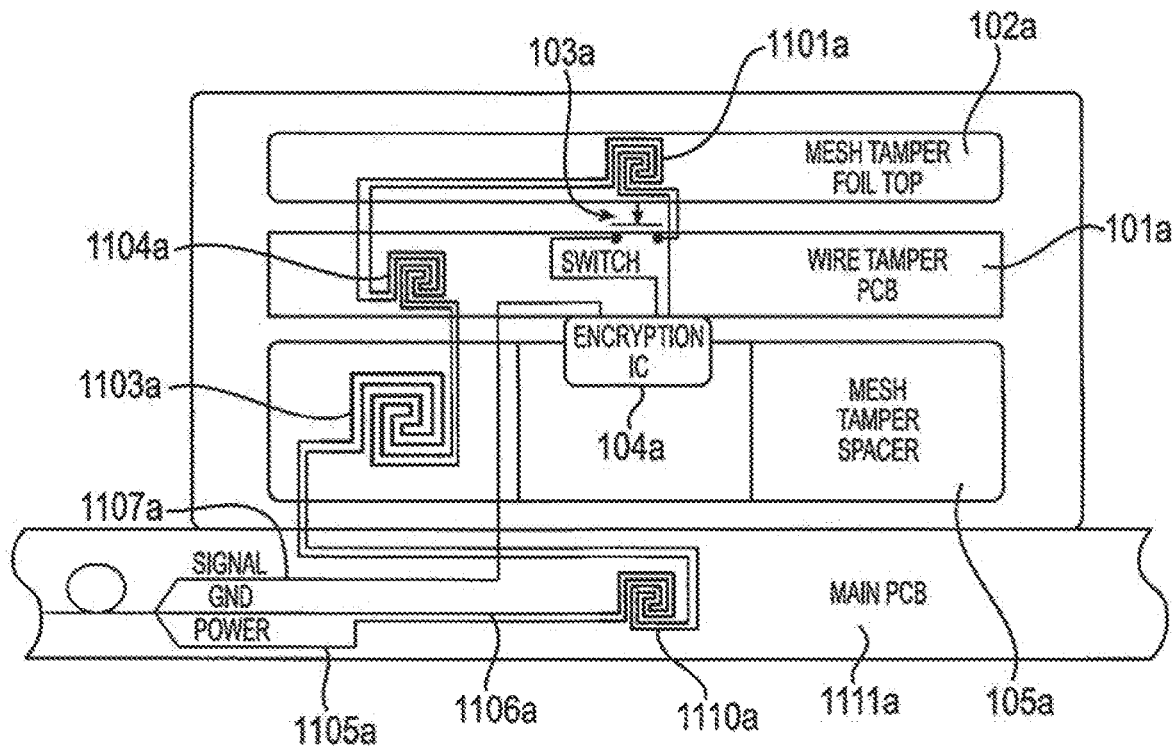
Figure 11B:
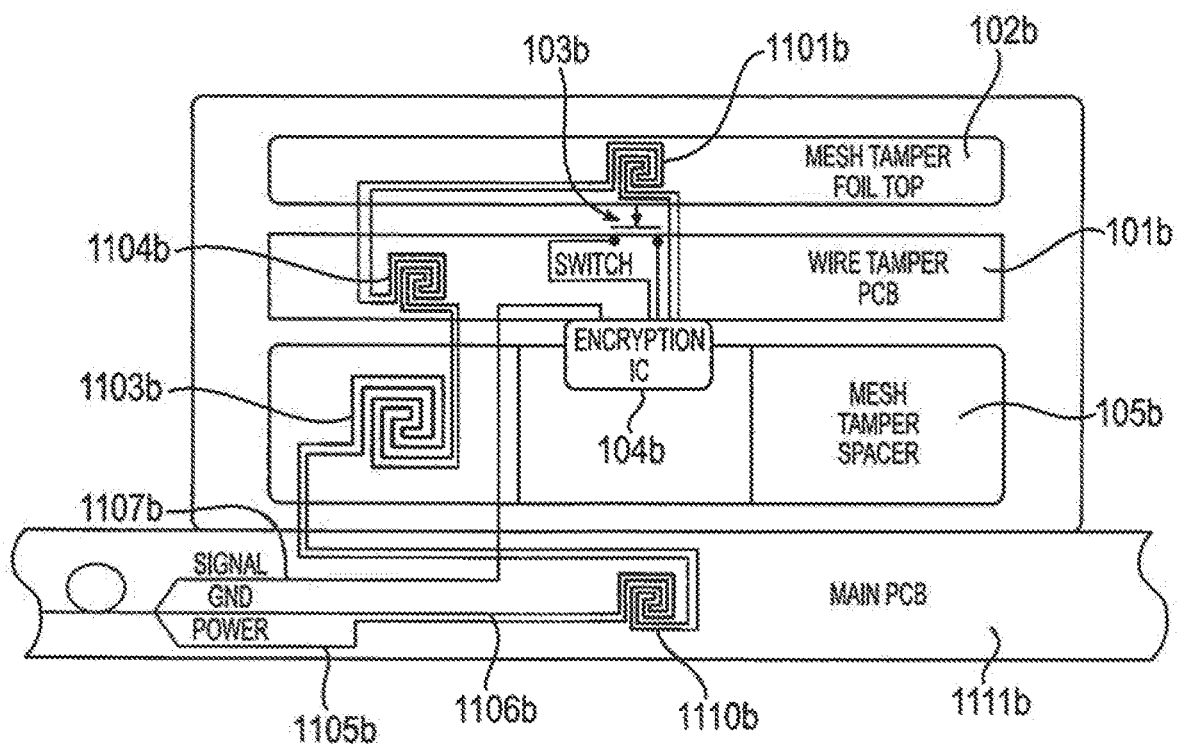

For the sensors of FIGS. 11a and 11b, the signal line 1107a is connected directly to the tamper circuitry 104a,b without being part of any mesh tracks, while both the Power and GND signals, 1105a,b, 1106a,b are connected to the tamper circuitry 104a,b via tamper lines. A first tamper line being connected to the GND signal 1106a is defined by a serial connection of the switch 103a, a first track of the top membrane mesh 1101a, a first track of the carrier PCB mesh 1104a, a first track of the spacer board mesh 1103a, and a first track of the bottom board mesh 1110a. A second tamper line being connected to the Power signal 1105a is defined by a serial connection of a second track of the top membrane mesh 1101a, a second track of the carrier PCB mesh 1104a, a second track of the spacer board mesh 1103a, and a second track of the bottom board mesh 1110a.

For the sensor of FIG. 11b, a first tamper line is defined by a serial connection going out from a first input/output of the circuitry 104b to the switch 103b and back to a second input/output of the circuitry 104b; a second tamper line being connected to the GND signal 1106b is defined by a serial connection of a first track of the top membrane mesh 1101b, a first track of the carrier PCB mesh 1104b, a first track of the spacer board mesh 1103b, and a first track of the bottom board mesh 1110b. A third tamper line being connected to the Power signal 1105b is defined by a serial connection of a second track of the top membrane mesh 1101b, a second track of the carrier PCB mesh 1104b, a second track of the spacer board mesh 1103b, and a second track of the bottom board mesh 1110b.

Figure 11C:
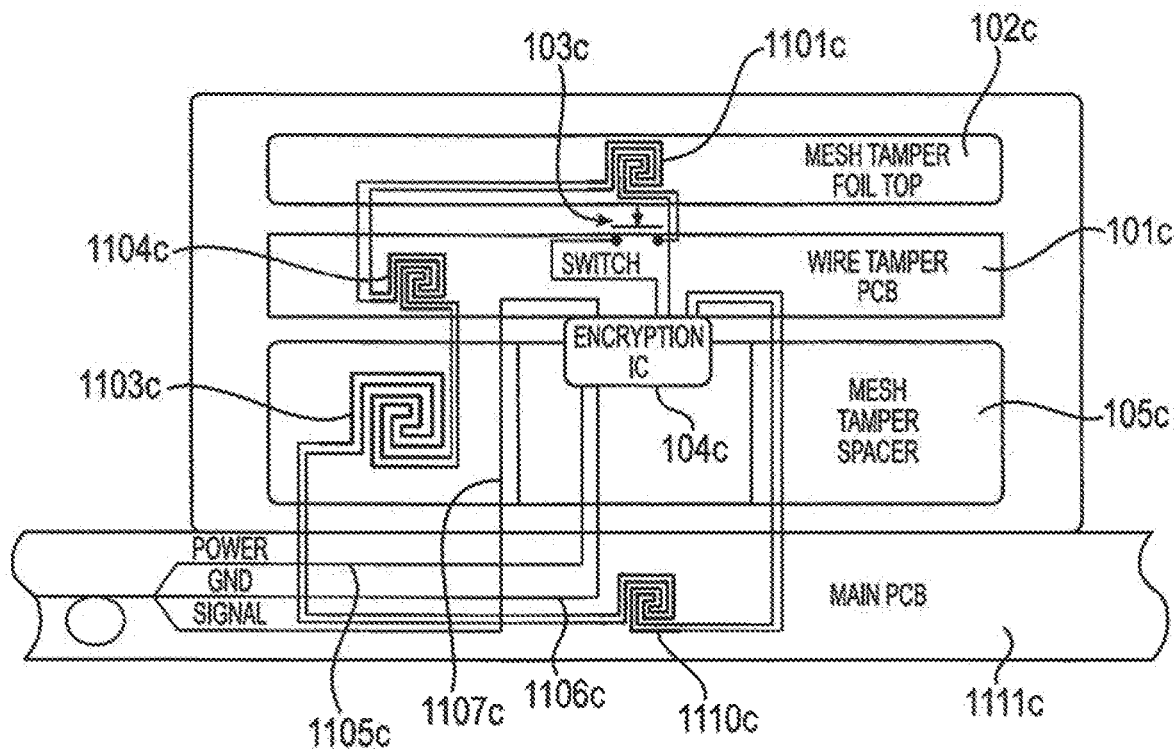
Figure 11D:
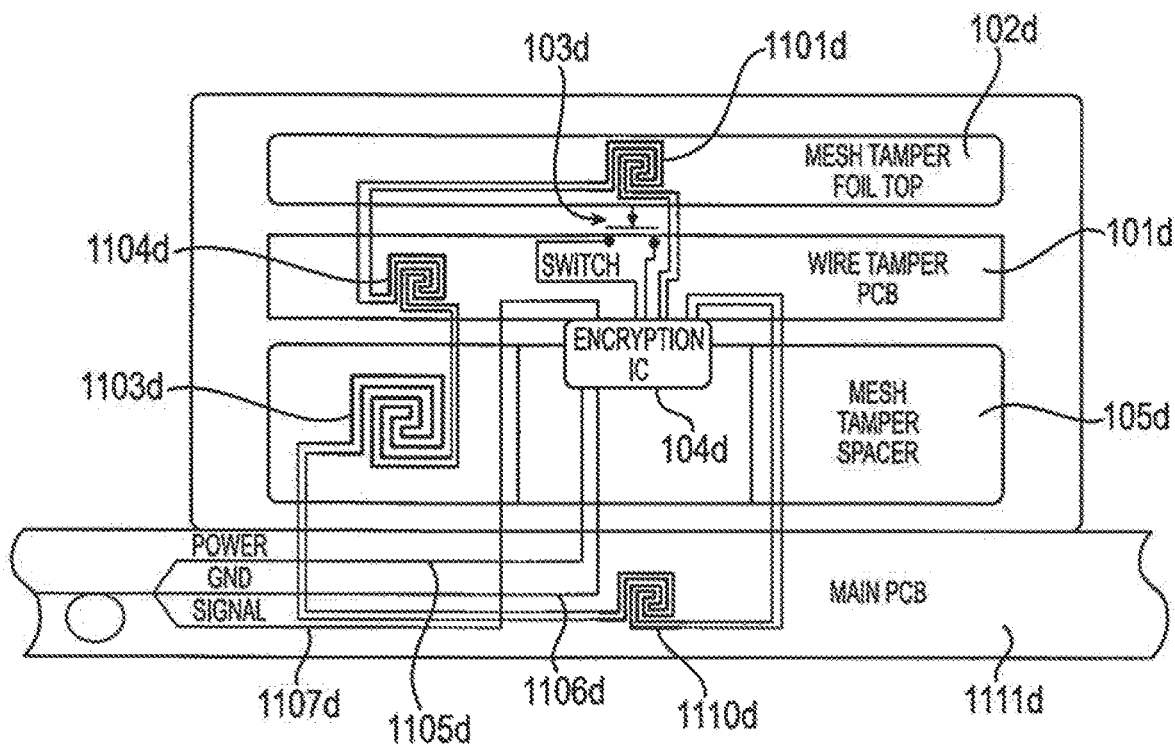

For the sensors of FIGS. 11c and 11d, the Power and GND signals, 1105c,d and 1106c,d, and the signal line 1107c,d are connected directly to the tamper circuitry 104c,d without being part of any mesh tracks. For the sensor of FIG. 11c, a first tamper line is defined by a serial connection going out from a first input/output of the circuitry 104c to the switch 103c, through a first track of the top membrane mesh 1101c, through a first track of the carrier PCB mesh 1104c, through a first track of the spacer board mesh 1103c, through a first track of the bottom board mesh 1110c, through tracks of the spacer board and the carrier PCB and back to a second input/output of the circuitry 104c. A second tamper line is defined by a serial connection going out from a third input/output of the circuitry 104c through a second track of the top membrane mesh 1101c, through a second track of the carrier PCB mesh 1104c, through a second track of the spacer board mesh 1103c, through a second track of the bottom board mesh 1110c, through tracks of the spacer board and the carrier PCB back to a fourth input/output of the circuitry 104c.

For the sensor of FIG. 11d, a first tamper line is defined by a serial connection going out from a first input/output of the circuitry 104d to the switch 103d and back to a second input/output of the circuitry 104d. A second tamper line is defined by a serial connection going out from a third input/output of the circuitry 104d, through a first track of the top membrane mesh 1101d, through a first track of the carrier PCB mesh 1104d, through a first track of the spacer board mesh 1103d, through a first track of the bottom board mesh 1110d, through tracks of the spacer board and the carrier PCB and back to a fourth input/output of the circuitry 104d. A third tamper line is defined by a serial connection going out from a fifth input/output of the circuitry 104d through a second track of the top membrane mesh 1101d, through a second track of the carrier PCB mesh 1104d, through a second track of the spacer board mesh 1103d, through a second track of the bottom board mesh 1110d, through tracks of the spacer board and the carrier PCB and back to a sixth input/output of the circuitry 104d.

Figure 12A:
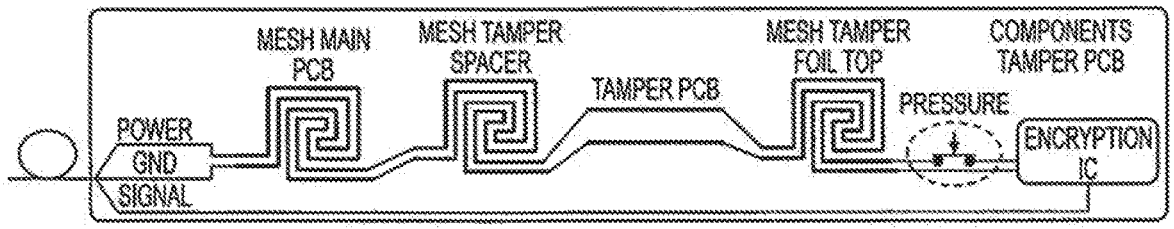
FIGS. 12a-12e illustrate different operational states of the electronic circuitry illustrated in FIG. 11a, FIGS. 12f-12j illustrate different operational states of the electronic circuitry illustrated in FIG. 11c, FIGS. 12k-12o illustrate different operational states of the electronic circuitry illustrated in FIG. 11d, FIGS. 13a and 13b are schematic illustrations of the arrangement of electrically conductive mesh tracks within the tamper responsive sensor of FIGS. 1b and 1c, respectively.
Figure 12B:
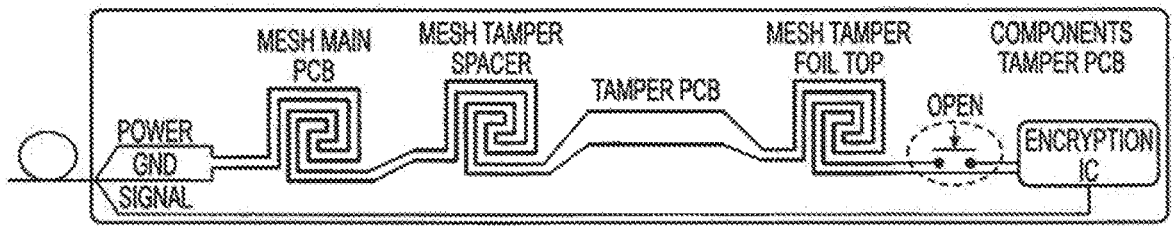
Figure 12C:
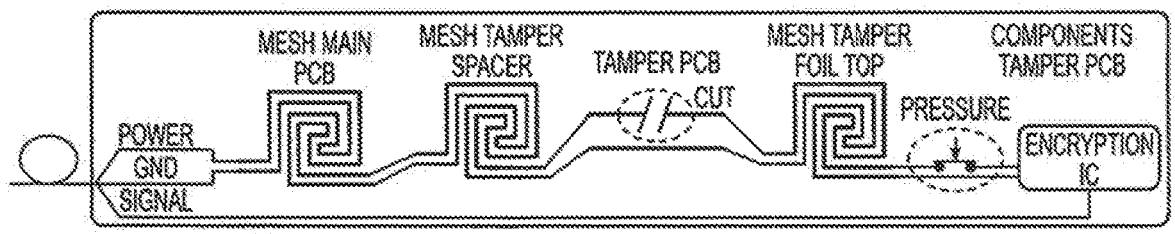
Figure 12D:
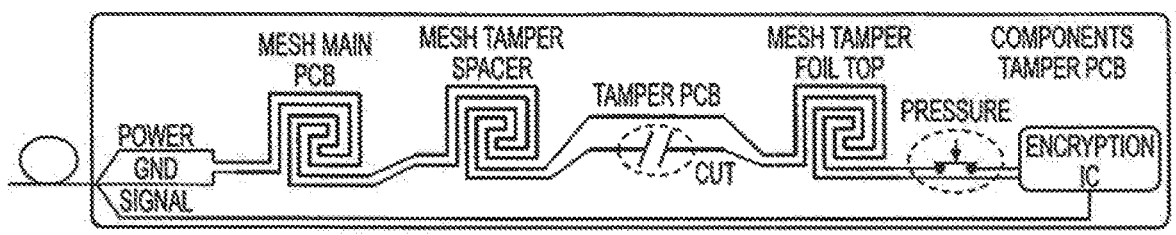
Figure 12E:
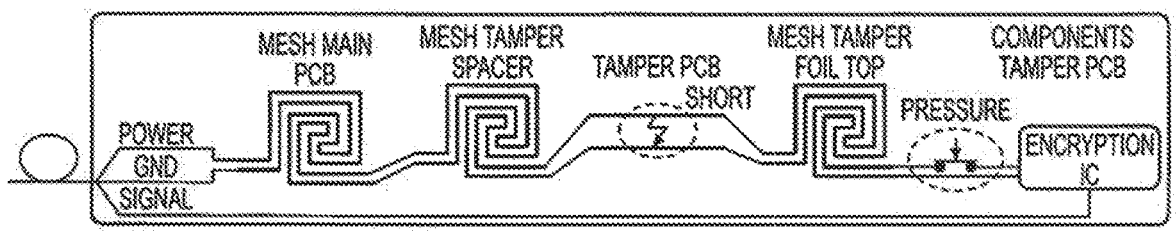

FIGS. 12a-12e illustrate different operational states of the electronic circuitry illustrated in FIG. 11a. FIG. 12a illustrates the normal working state with the switch 103a in the closed position and power being supplied to the encryption IC 104a. FIG. 12b illustrates a disassembly situation, where the power supply to the circuit 104a is cut by the switch 103a, which is now in the open position. FIG. 12c illustrates the situation where there is loss of power to the circuit 104a due to a cut or break in the first tamper line. FIG. 12d illustrates the situation where there is loss of power to the circuit 104a due to a cut or break in the second tamper line, and FIG. 12e illustrates the situation where there is loss of power to the circuit 104a due to a short between the first and second tamper lines.

Figure 12F:
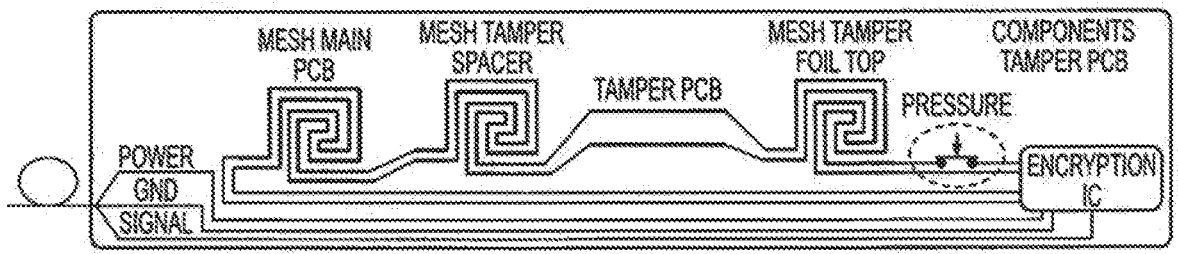
Figure 12G:
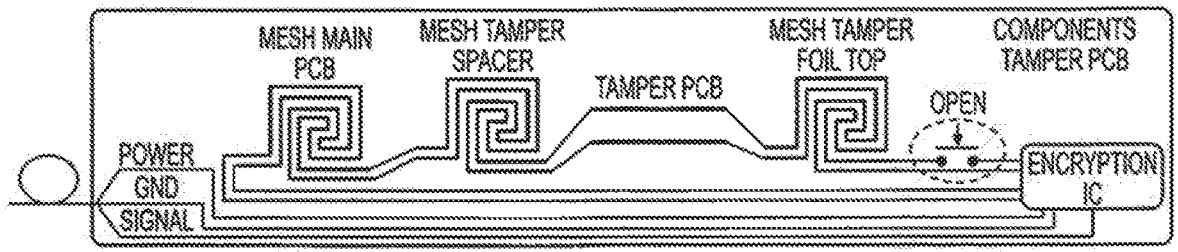
Figure 12H:
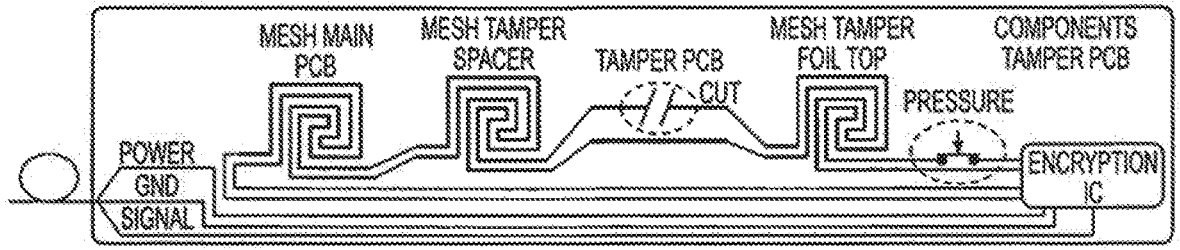
Figure 12I:
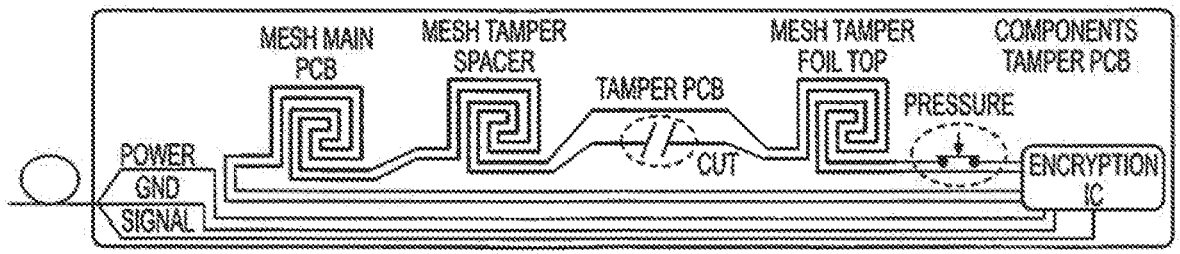
Figure 12J:
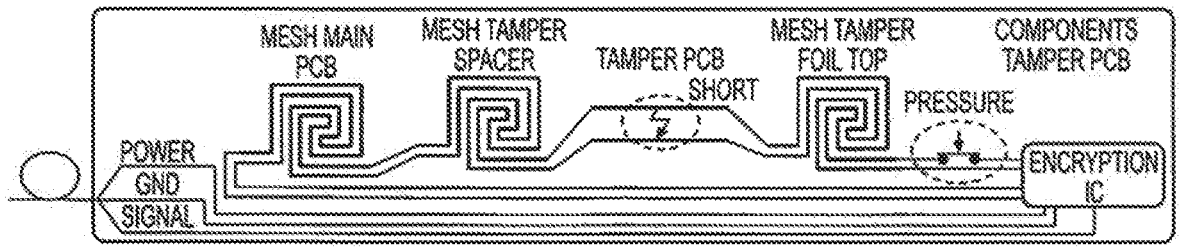

FIGS. 12f-12j illustrate different operational states of the electronic circuitry illustrated in FIG. 11c. FIG. 12f illustrates the normal working state with the switch 103c in the closed position. FIG. 12g illustrates a disassembly situation, where the signal line from the circuit 104c through the first tamper line is cut by the switch 103c, which is now in the open position. FIG. 12h illustrates the situation where the signal line from the circuit 104c through the first tamper line is cut due to a cut or break in the first tamper line. FIG. 12i illustrates the situation where the signal line from the circuit 104c through the second tamper line is cut due to a cut or break in the second tamper line. FIG. 12j illustrates the situation where there is an interruption of the signal through the first and second tamper lines due to a short between the first and second tamper lines.

Figure 12K:
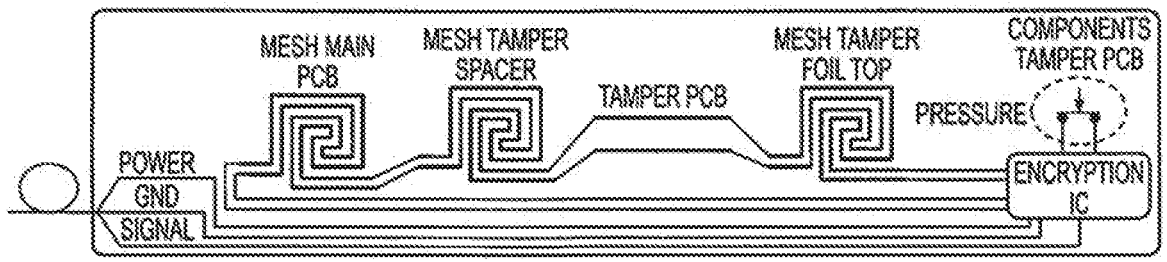
Figure 12L:
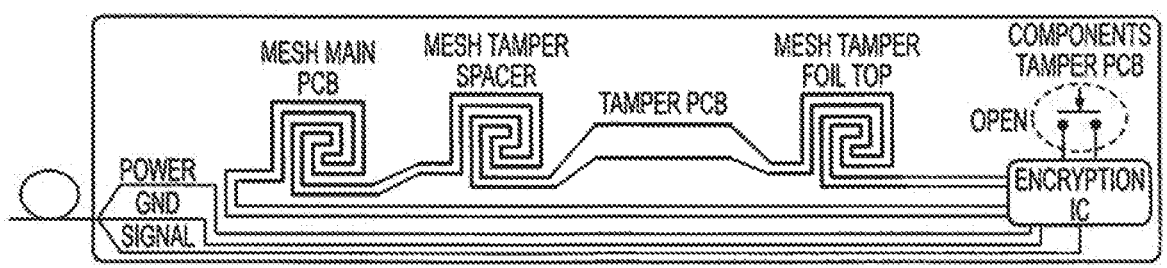
Figure 12M:
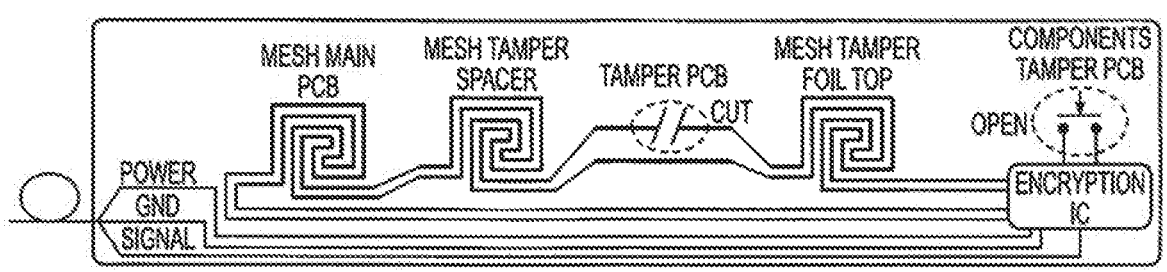
Figure 12N:
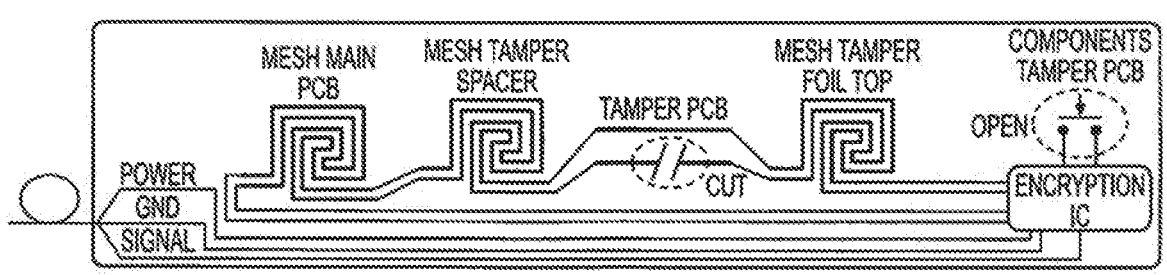
Figure 12O:
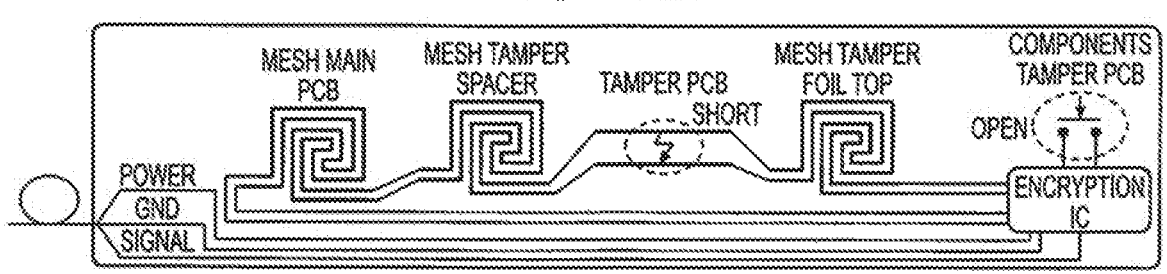

FIGS. 12k-12o illustrate different operational states of the electronic circuitry illustrated in FIG. 11d. FIG. 12k illustrates the normal working state with the switch 103d in the closed position. FIG. 12l illustrates a disassembly situation, where the signal line from the circuit 104d through the first tamper line is cut by the switch 103d, which is now in the open position. FIG. 12m illustrates the situation where the signal line from the circuit 104d through the second tamper line is cut due to a cut or break in the second tamper line. FIG. 12n illustrates the situation where the signal line from the circuit 104d through the third tamper line is cut due to a cut or break in the third tamper line. FIG. 12o illustrates the situation where there is an interruption of the signal through the second and third tamper lines due to a short between the second and third tamper lines.

It is noted that for the sensors of the present invention, protection is provided from the top by the tamper switch 103, 203 and the mesh signals are routed in a certain pattern in the PCBs that make them difficult to attack, thereby providing protection from the sides of the carrier PCB 101, 201 and the sides of the spacer board 105, 205. Optionally also from the bottom side, when a bottom membrane or a bottom board is provided at the bottom of the spacer board 105, 205. For sensors having a top membrane 102, the mesh of the top membrane provides further protection from the top.

An example of the electrical PCB stack-up of the tamper sensor or switch 100 is illustrated in FIG. 13a, while an example of the electrical PCB stack-up of the tamper sensor or switch 110 is illustrated in FIG. 13b. The top membrane or tamper foil top 102 may comprise two mesh layers and may have four connections to the carrier PCB 101.

According to one embodiment, the carrier PCB or tamper PCB 101 has no mesh layers but includes track routings of the signals to the circuitry 104, with routing on the top of the carrier PCB 101 for connecting to the top membrane mesh 901a, and routing on the bottom to the circuitry 104 and four inside platings for soldering to the spacer board 105. However, it is preferred that the carrier PCB 101 has one or more mesh layers 903a as illustrated in FIG. 9a, and routings for connecting to the top membrane mesh 901a, and routing on the bottom to the circuitry 104 and inside platings for soldering to the spacer board 105. The spacer board or tamper spacer 105 may hold four routing layers, with the first top layer holding GND and four inside soldering to the carrier PCB 101, the second and third layers being mesh layers 903a, and the fourth bottom layer holding GND and four outside platings for soldering, eg. to a 3rd party PCB 301. The bottom board or second membrane or tamper foil bottom 111 may also comprises two mesh layers and may have four connections to the tamper spacer 105 and/or carrier PCB 101.

The tamper responsive sensor or switch 100, 110 or 200 of the present invention may be considered as a small mechanical security switch, which can be used as a tamper sensor within security critical areas. A Security CPU may control multiple tamper sensors to generate a larger secure zone. This is illustrated in the schematic block diagram of FIG. 14, in which a Security CPU 1401 is in data communication with three tamper responsive sensors 1402, 1403, 1404.

When a tamper responsive sensor 1402, 1403, 1404 has been installed, the sensor can be activated. This may be done by personalizing each sensor with its own encryption key, which may be communicated from the Security CPU 1401 to the sensor via the data communication signal line. The encryption key may be loaded into a RAM area inside the circuitry or encryption IC 104 of the sensor. The sensor is now armed for communicating encrypted data with the Security CPU 1401. The encryption can work with "one-way encryption" as well as "two-way encryption". One-way encryption is a term used, when a message can be encrypted but the message cannot be decrypted again. Two-way encryption is a term used when a message can be both encrypted and decrypted.

For the sensors of the present invention, it is preferred to use one-way encryption for the embodiments where one or both of power signals are part of a tamper line, whereby the encryption circuitry 104 will lose power and the stored encryption may be deleted. Two-way encryption is the preferred process for the embodiments where none of the two power signals are part of a tamper line, in which situation the encryption circuitry 104 may be fully functioning when being tampered.

Figure 15:
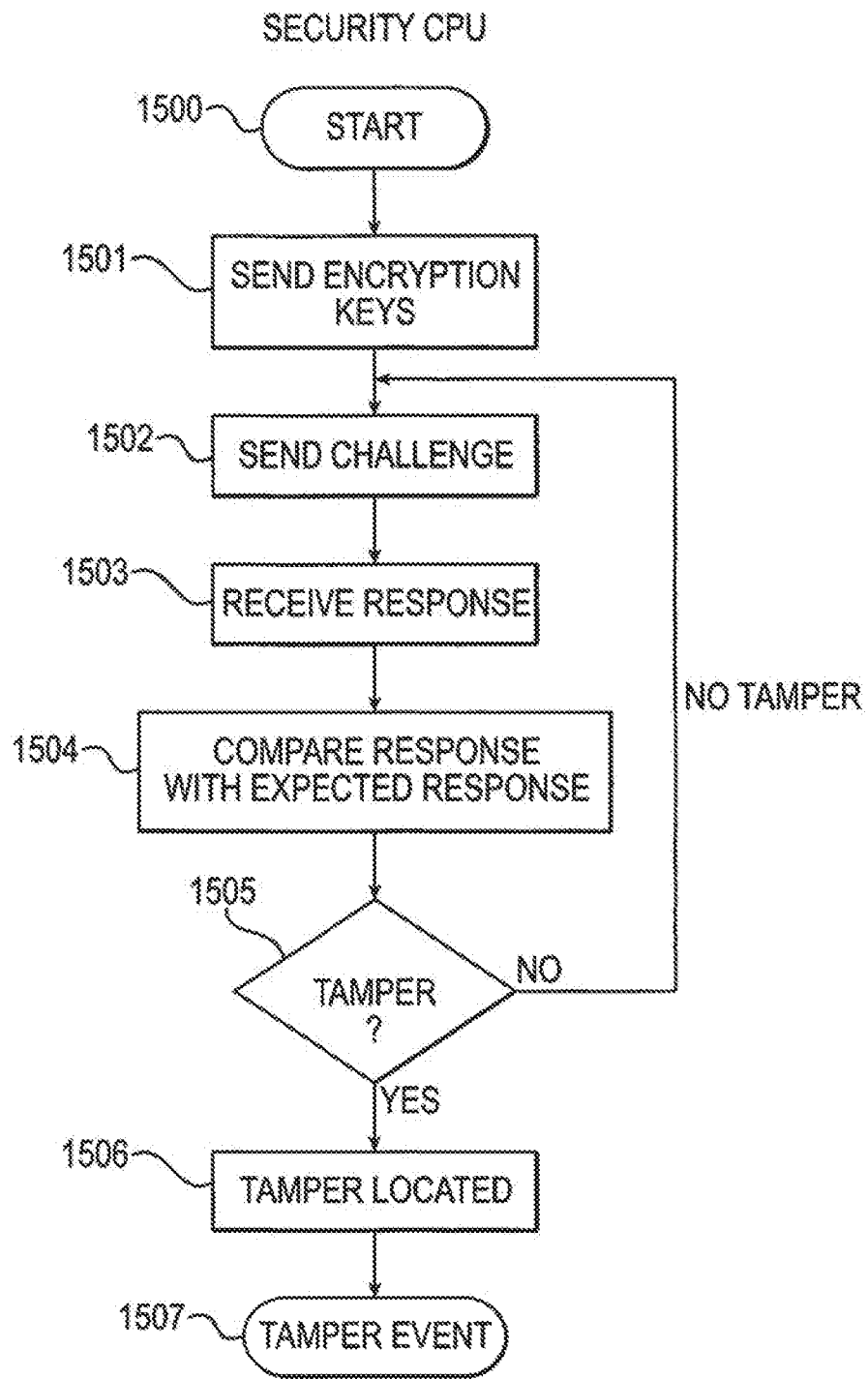
FIG. 15 is a flow chart illustrating a first example of data communication between the security CPU and a tamper responsive sensor according to embodiments of the present invention.

FIG. 15 is a flow chart illustrating an example of data communication between the security CPU 1401 and tamper responsive sensors 11402, 1403, 1404 by use of "one-way encryption". The start position 1500 shows the situation when a tamper responsive sensor 1402 has been installed and connected to the Security CPU 1401. In the first step 1401, the Security CPU 1401 is responsible for activating the tamper responsive sensor 1402 by sending an encryption key to the sensor 1402, which key is then stored in a memory of the tamper detecting circuitry or encryption IC 104. The same encryption key is stored in the Security CPU 1401.
During Normal Operation The CPU 1401 will send a challenge to a connected tamper sensor 1402—step 1402. The CPU 1401 receives a corresponding encrypted response from the tamper sensor 1402—step 1403.

The CPU 1401 compares the received response with a local calculated response, which is encrypted by use of the corresponding local key—step 1404.

If there is a match between received and calculated responses, no tamper event has occurred; if no response has been received from the tamper sensor 1402 or an incorrect answer has been received, then it is considered as a tamper event at the sensor 1402—steps 1406 and 1407.

If a tamper event is detected then it is up to the security CPU 1401 to react on it.

It is preferred that a SHA or SHA-256 hash algorithm is used for the one-way encryption processes in order to provide a very high level of security. A large key length of 256-bits prevents exhaustive attacks, while the multiple physical security features of the tamper sensor 1402 prevent unauthorized disclosure of the secret key stored within the tamper detecting circuitry or encryption IC 104. For the one-way encryption process, the stored key is automatically erased when the power is removed from the circuitry 104. It is preferred that the tamper detecting circuitry or encryption IC 104 contains a unique 48-bit serial number, which is used in combination with the received challenge, step 1402, and the stored secret key to generate a response, which is unique for every individual tamper sensor 1402, 1403, 1404. Thus, any disassembly or tamper event may cause the circuitry or encryption IC 104 to delete the stored encryption key, and if the encryption key of the circuitry 104 is deleted, it is noticed by the Security CPU 1401, which will then be able to react to the tamper situation.

Figure 16:
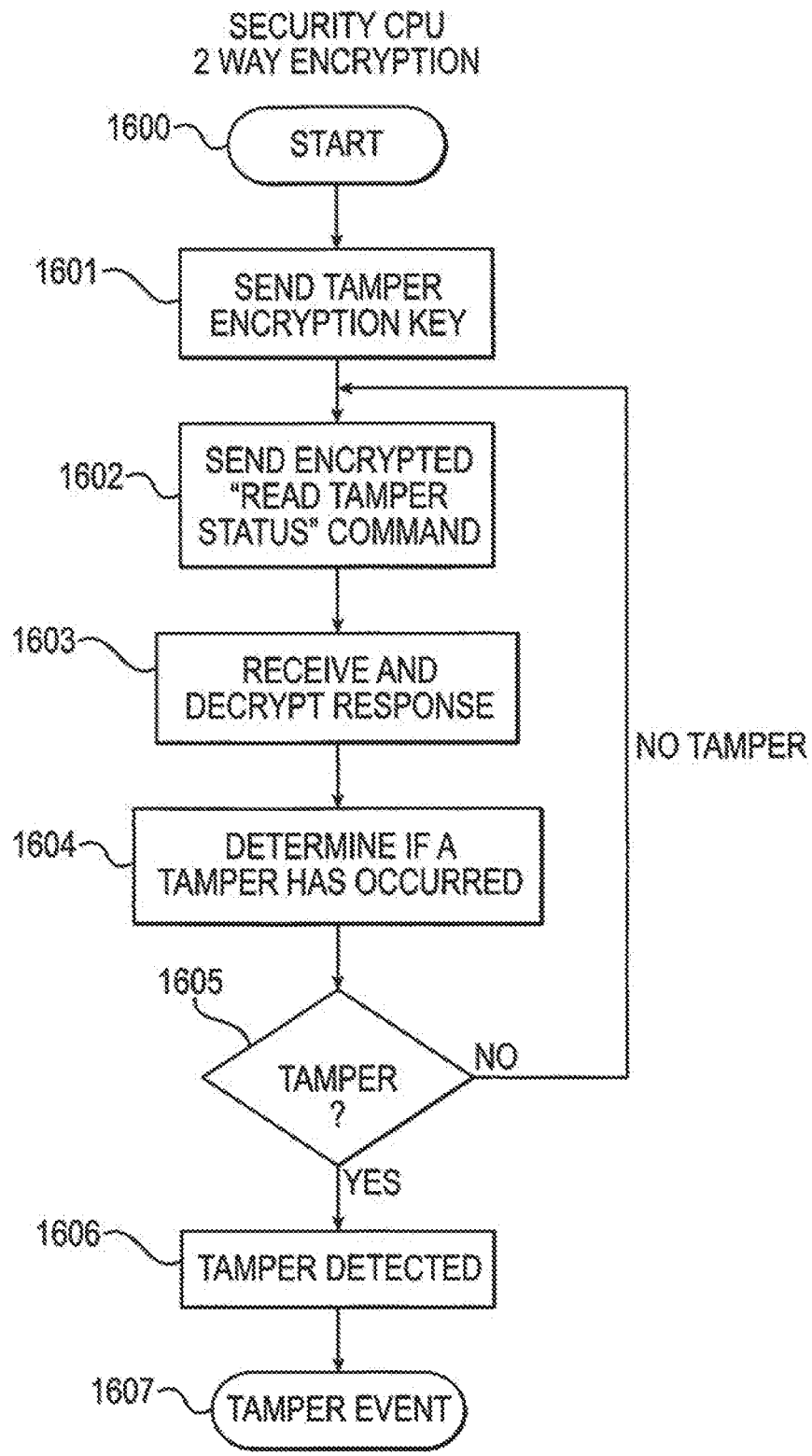
FIG. 16 is a flow chart illustrating a second example of data communication between the security CPU and a tamper responsive sensor according to embodiments of the present invention.

FIG. 16 is a flow chart illustrating an example of data communication between the security CPU 1401 and tamper responsive sensors 11402, 1403, 1404 by use of "two-way encryption". The start position 1600 shows the situation when a tamper responsive sensor 1402 has been installed and connected to the Security CPU 1401. In the first step 1601, the Security CPU 1401 is responsible for activating the tamper responsive sensor 1402 by sending an encryption key to the sensor 1402, which key is then stored in a memory of the tamper detecting circuitry or encryption IC 104. A corresponding local key is stored in the Security CPU 1401. Which keys are stored in the sensor 1402 and the CPU 1401 depends on the selected encryption scheme, which for example can be AES, DES or TDES.
During Normal Operation
Step 1602

The CPU 1401 will send an encrypted "read tamper status" command to a connected tamper sensor 1402 and the received command is decrypted by use of the key stored within the circuitry 104 of the sensor 1402, and any instructions given by the command is executed. The status of the internal tamper flag(s) is/are either set or cleared, indicating if any switch or mesh has been triggered. The sensor 1402 sends an encrypted tamper message to the Security CPU 1401.
Step 1603

The Security CPU 1401 decrypts the received message.
Steps 1604 and 1605

The Security CPU 1401 determines if a tamper has occurred by reading if the tamper flag status is set.
Steps 1606 and 1607

If the tamper flag is set, then it is considered as a tamper event at the sensor 1402, and then it is up to the security CPU 1401 to react on it.

The invention claimed is:
1. A tamper responsive sensor comprising:
a carrier printed circuit board, having a mesh with at least one electrically conductive tracks;

a switch contact selected from a group consisting of a pressure switch contact and a force sensitive switch contact having first and second electrical contact connections;

tamper detecting circuitry arranged at the carrier printed circuit board and being powered via two electrical power lines and connected to at least one electrically conductive signal lines;

wherein a first line selected from a group consisting of said power lines and one of said signal lines is electrically connected to the tamper detecting circuitry via a first tamper line holding the switch contact, and wherein a second line selected from a group consisting of said power lines and one of said signal lines is electrically connected to the tamper detecting circuitry via a second tamper line holding a conductive track of the carrier printed circuit board mesh, thereby enabling the tamper detecting circuit to detect an interruption of the signal path through at least one of a tamper line selected from the group consisting through of the first tamper line, the second tamper line, and both the first tamper line and the second tamper line;

wherein the carrier printed circuit board is arranged on top of a spacer board and the tamper detecting circuitry is arranged at a bottom of the carrier printed circuit board, with the spacer board surrounding the tamper detecting circuitry, and with a wall height of the spacer board being higher than a height of the tamper detecting circuitry; and the switch contact is arranged on top of the carrier printed circuit board.

2. The tamper responsive sensor according to claim 1, wherein the first tamper line and the second tamper line are serial connected, which serial connection holds the switch contact and a conductive track of the carrier PCB mesh, wherein one of a group consisting of one of said power lines and one of said signal lines is electrically connected to the tamper detecting circuitry through said serial connection.

3. The tamper responsive sensor according to claim 1, wherein the first tamper line and the second tamper line are separate signal lines.

4. The tamper responsive sensor according to claim 1, wherein the second tamper line further holds a conductive track of the carrier PCB mesh being serial connected to the switch contact.

5. The tamper responsive sensor according to claim 1, wherein the electrical signal path through a tamper line is interrupted when a track being part of said tamper line is cut or short-circuited, and wherein the electrical signal path through the second tamper line is interrupted when the switch contact is in an open position.

6. The tamper responsive sensor according to claim 1, wherein the carrier printed circuit board and the spacer board is made as a single board.

7. The tamper responsive sensor according to claim 1, wherein the spacer board comprises a mesh of at least one electrically conductive tracks, and wherein the first tamper line and/or the second tamper line further holds a conductive track of the spacer board mesh in serial connection with one of a group consisting of the switch contact and at least one electrically conductive track of a tamper line selected from a group consisting of the first tamper line and the second tamper line.

8. The tamper responsive sensor according to claim 7, further comprising a bottom board arranged at a bottom of the spacer board, said bottom board comprising a mesh of at least one electrically conductive tracks, and wherein a tamper line selected from a group consisting of the first tamper line and the second tamper line further holds a conductive track of the bottom board mesh in serial connection with one of a group consisting of the switch contact, the first tamper line, and the second tamper line.

9. The tamper responsive sensor according to claim 8, wherein at least one bottom board mesh track is connected to at least one corresponding electrical contact connections provided at a top of the bottom board.

10. The tamper responsive sensor according claim 9, wherein at least one spacer board mesh track is connected to at least one corresponding electrical contact connections provided at one of a group consisting of a side and bottom of the spacer board.

11. The tamper responsive sensor according to claim 10, wherein at least one bottom board mesh track is connected to at least one spacer board mesh track via corresponding electrical contact connections of the bottom board and the spacer board.

12. The tamper responsive sensor according to claim 7, further comprising a bottom membrane arranged at a bottom of the spacer board, said bottom membrane comprising a bottom mesh of at least one electrically conductive track, and wherein a tamper line selected from a group consisting of the first tamper line and the second tamper line further holds a conductive track of the bottom membrane mesh in serial connection with one of a group consisting of the switch contact and a mesh track from a tamper line selected from a group of the first tamper line and the second tamper line.

13. The tamper responsive sensor according to claim 1, further comprising a flexible membrane on top of the carrier PCB with the switch contact interposed between the carrier PCB and the flexible top membrane, said top membrane comprising a mesh of at least one electrically conductive tracks, and wherein a selected tamper line selected from the group consisting of the first tamper line and the second tamper line further holds a conductive track of the top membrane mesh in serial connection with the switch contact and the mesh.

14. The tamper responsive sensor according to claim 1, wherein the first tamper line and the second tamper line are separate signal lines,
wherein the second tamper line further holds a conductive track of the carrier printed circuit board mesh being serial connected to the switch contact, and
wherein a first of the two power lines is electrically connected to the tamper detecting circuitry via the first tamper line, and the second of the power lines is electrically connected to the tamper detecting circuitry via the second tamper line.

15. The tamper responsive sensor according to claim 1, wherein the tamper detecting circuitry has a first signal output and a first signal input being electrically connected together by a conductive signal line holding the first tamper line.

16. (The tamper responsive sensor according to claim 1, wherein the tamper detecting circuitry has a second signal output and a second signal input being electrically connected together by a conductive signal line holding the second tamper line.

17. The tamper responsive sensor according to claim 1, wherein the tamper detecting circuitry has a data communication signal input for receiving data from an external data communication system and a data communication signal output for forwarding data from the external communication system, wherein one of a group consisting of the data communication signal input and data communication output is coupled with one of said conductive signal lines.

18. The tamper responsive sensor according to claim 17, wherein the conductive signal line connected to the data communication signal input holds the first tamper line.

19. The tamper responsive sensor according to claim 17, wherein the tamper detecting circuitry comprises a memory for storing an encryption key, and wherein the tamper detecting circuitry is adapted for encrypting data by use of the stored encryption key, and further adapted for outputting the encrypted data.

20. The tamper responsive sensor according to claim 19, wherein upon detection of a breakage or interruption of any of the tamper lines, the tamper detecting circuitry is operable to erase the encryption key stored in the memory.

21. The tamper responsive sensor according to claim 19, further comprising a security processor being external to the tamper responsive sensor that is coupled with the tamper detecting circuitry for forwarding and receiving data to and from the tamper detecting circuitry.

22. The tamper responsive sensor according to claim 21, wherein the security processor is operable to determine from encrypted date received from the tamper detecting circuitry, whether a tamper line has been tampered.

23. The tamper responsive sensor according to claim 21, wherein the security processor is operable to forward an encryption key to the tamper detecting circuitry for storing in the memory of the tamper detecting circuitry.

24. The tamper responsive sensor according to claim 21, wherein the security processor and the tamper detecting circuitry are operable to perform a one way encryption process to determine whether the switch tamper line has been tampered.

25. The tamper responsive sensor according to claim 24, wherein the security processor and the tamper detecting circuitry stores corresponding encryption keys, and wherein the security processor is operable to forward a message to the tamper detecting circuitry for encrypting said message by use of the stored key, and the tamper detecting circuitry is operable to encrypt the received message by use of the stored key and forward the encrypted result to the security processor, the security processor is operable to compare the received encrypted result with its own encrypted result to determine whether a tamper line has been tampered.

26. The tamper responsive sensor according to claim 21, wherein the security processor and the tamper detecting circuitry are operable to perform a two way encryption process to determine whether a tamper line has been tampered.

27. The tamper responsive sensor according to claim 26, wherein the security processor and the tamper detecting circuitry stores corresponding keys for encryption and decryption.

* * * * *